United States Patent
Chen et al.

(10) Patent No.: US 12,146,970 B2
(45) Date of Patent: Nov. 19, 2024

(54) POSITIONING METHOD, DEVICE, AND ELECTRONIC APPARATUS

(71) Applicant: ALIBABA GROUP HOLDING LIMITED, Grand Cayman (KY)

(72) Inventors: Cheng Chen, Beijing (CN); Shuai Zhou, Beijing (CN); Qiang Xu, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 293 days.

(21) Appl. No.: 17/314,675

(22) Filed: May 7, 2021

(65) Prior Publication Data

US 2021/0263167 A1 Aug. 26, 2021

Related U.S. Application Data

(63) Continuation of application No. PCT/CN2019/114961, filed on Nov. 1, 2019.

(30) Foreign Application Priority Data

Nov. 9, 2018 (CN) .......................... 201811333871.X

(51) Int. Cl.
*G01S 19/49* (2010.01)
*G01C 21/16* (2006.01)
(Continued)

(52) U.S. Cl.
CPC .............. *G01S 19/49* (2013.01); *G01C 21/16* (2013.01); *G01C 21/1652* (2020.08); *G01S 19/485* (2020.05); *G05D 1/024* (2013.01)

(58) Field of Classification Search
CPC ........ G01S 19/48; G01S 19/49; G01S 19/485; G01S 17/89; G01S 17/931; G01C 21/16;
(Continued)

(56) References Cited

U.S. PATENT DOCUMENTS

2011/0164037 A1 7/2011 Yoshida et al.
2014/0233010 A1 8/2014 Baldwin et al.
(Continued)

FOREIGN PATENT DOCUMENTS

CN 103778429 A 5/2014
CN 105667518 A 6/2016
(Continued)

OTHER PUBLICATIONS

"Chen Yue, The treating method and apparatus of pavement markers information, 2017" NPL attached. (Year: 2017).*
(Continued)

*Primary Examiner* — James M McPherson
*Assistant Examiner* — Bakari Underwood

(57) ABSTRACT

A positioning method, a device, and an electronic apparatus. The method comprises: obtaining a GNSS position of a vehicle; obtaining standard positioning data around a road where the vehicle is located; obtaining laser point cloud data around the road where the vehicle is located; extracting to-be-matched positioning data around the road; forward simulating a motion state of the vehicle based on sampling positions corresponding to the vehicle at a previous moment, to obtain sampling positions at a current moment; converting the to-be-matched positioning data into a coordinate system corresponding to the standard positioning data; matching the to-be-matched positioning data with the standard positioning data to obtain a probability that the vehicle is located at each sampling position at the current moment; and obtaining a position of the vehicle based on the probability that the vehicle is located at each sampling position at the current moment.

20 Claims, 18 Drawing Sheets

(51) Int. Cl.
  *G01S 19/48* (2010.01)
  *G05D 1/00* (2024.01)
  *G05D 1/02* (2020.01)
(58) Field of Classification Search
  CPC .. G01C 21/30; G01C 21/1652; G01C 21/165; G05D 1/024; G05D 1/0278; G05D 2201/0213
  USPC .......................................................... 701/32
  See application file for complete search history.

(56) References Cited

U.S. PATENT DOCUMENTS

| | | | |
|---|---|---|---|
| 2015/0331111 | A1 | 11/2015 | Newman et al. |
| 2017/0053538 | A1 | 2/2017 | Samarasekera et al. |
| 2018/0136665 | A1 | 5/2018 | Mudalige et al. |
| 2018/0150086 | A1 | 5/2018 | Nobukawa et al. |
| 2018/0188032 | A1 | 7/2018 | Ramanandan et al. |
| 2018/0202814 | A1 | 7/2018 | Kudrynski et al. |
| 2018/0299273 | A1* | 10/2018 | Cai .................. G01S 17/89 |
| 2018/0299557 | A1 | 10/2018 | Yi et al. |
| 2019/0226853 | A1* | 7/2019 | Kubiak ............. G01S 13/426 |
| 2019/0250622 | A1 | 8/2019 | Nister et al. |
| 2020/0081134 | A1 | 3/2020 | Wheeler et al. |
| 2020/0098135 | A1 | 3/2020 | Ganjineh et al. |
| 2020/0132850 | A1 | 4/2020 | Crouch et al. |
| 2022/0214174 | A1* | 7/2022 | Kudrynski ............ G06T 7/55 |

FOREIGN PATENT DOCUMENTS

| | | | | |
|---|---|---|---|---|
| CN | 106845321 | A * | 6/2017 | ......... G06K 9/00798 |
| CN | 107850449 | A | 3/2018 | |
| CN | 107918753 | A | 4/2018 | |
| CN | 108068792 | A | 5/2018 | |
| CN | 108120449 | A * | 6/2018 | ........... G01C 21/343 |
| CN | 108241819 | A | 7/2018 | |
| CN | 108267747 | A | 7/2018 | |
| CN | 108320329 | A | 7/2018 | |
| CN | 108732582 | A | 11/2018 | |
| CN | 108732584 | A | 11/2018 | |
| CN | 108732603 | A | 11/2018 | |
| CN | 110062871 | A | 7/2019 | |
| CN | 110100151 | A | 8/2019 | |
| CN | 111133448 | A | 5/2020 | |
| EP | 3131020 | B1 | 12/2017 | |
| EP | 3130945 | B1 | 5/2018 | |
| KR | 20210003846 | A | 1/2021 | |
| WO | 2017066679 | A9 | 5/2017 | |
| WO | 2018068653 | A1 | 4/2018 | |
| WO | 2018071416 | A1 | 4/2018 | |
| WO | 2018126083 | A1 | 7/2018 | |
| WO | 2018140701 | A1 | 8/2018 | |
| WO | 2019168869 | A1 | 9/2019 | |

OTHER PUBLICATIONS

Fang Jie, Method and Apparatus for Assisting With Automobile Positioning, CN108120449A NPL attached (Year: 2018).*
Written Opinion of the International Searching Authority and International Search Report for PCT Application No. PCT/CN2019/114961 mailed on Feb. 5, 2020.
International Preliminary Report on Patentability Chapter I for PCT Application No. PCT/CN2019/114961 mailed on May 20, 2021.
First Search Report for Chinese Application No. 201811333871.X mailed on Mar. 31, 2023.
Sun et al., "Real-time ground point clouds extraction algorithm using extended vertices," Computer Engineering and Applications, Dec. 2016.
Supplemental Search for Chinese Application No. 201811333871.X mailed on Oct. 23, 2023.

* cited by examiner

POSITIONING METHOD, DEVICE, AND ELECTRONIC APPARATUS

CROSS-REFERENCE TO RELATED APPLICATIONS

This application is a continuation application of International Patent Application No. PCT/CN2019/114961, filed with the China National Intellectual Property Administration (CNIPA) on Nov. 1, 2019, and entitled "POSITIONING METHOD, DEVICE, AND ELECTRONIC APPARATUS," which is based on and claims priority to and benefits of Chinese Patent Application No. 201811333871.X, filed on Nov. 9, 2018. The entire content of all of the above-identified applications is incorporated herein by reference.

TECHNICAL FIELD

This specification relates to the field of positioning technologies, and in particular, to a positioning method, an apparatus, and an electronic device.

BACKGROUND

In a conventional vehicle positioning method, a real-time position of a vehicle is generally obtained based on a Global Navigation Satellite System (GNSS) mounted on the vehicle, and a meter-level position accuracy is generally achieved. After a high-precision map is generated, a positioning method based on a high-precision map is emerged. In the method, when a vehicle travels, environmental information around the vehicle is obtained in real time, and the environmental information is matched with pre-constructed high-precision positioning data, to obtain a high-precision positioning result of the vehicle. The high-precision positioning result generally has a centimeter-level positioning accuracy, which can meet requirements of automatic driving. During research on the existing positioning method based on a high-precision map, the inventor found that how to quickly and accurately determine a high-precision position of the vehicle is an urgent problem to be resolved.

SUMMARY

This specification provides a positioning method, an apparatus, and an electronic device, which can quickly and accurately determine the high-precision position of a vehicle.

To achieve the foregoing objectives, the following technical solutions are used in embodiments of this specification.

According to a first aspect, a positioning method is provided, including:

obtaining a GNSS position of a vehicle;

obtaining, based on the GNSS position of the vehicle, standard positioning data around a road where the vehicle is located from preset standard positioning data, where the standard positioning data includes laser point data of key points of an easily recognizable road object with a stable attribute on the road and/or by either side of the road;

obtaining laser point cloud data, outputted by a laser sensor of the vehicle, around the road where the vehicle is located;

extracting to-be-matched positioning data around the road where the vehicle is located from the laser point cloud data, where the to-be-matched positioning data includes laser point data of key points of an easily recognizable road object with a stable attribute on the road and/or by either side of the road where the vehicle is located;

forward simulating a motion state of the vehicle based on more than one sampling positions corresponding to the vehicle at a previous moment, to obtain more than one sampling positions corresponding to the vehicle at a current moment;

converting the to-be-matched positioning data into a coordinate system corresponding to the standard positioning data based on the more than one sampling positions corresponding to the vehicle at the current moment;

matching the to-be-matched positioning data in the converted coordinate system with the standard positioning data, to obtain a probability that the vehicle is located at each sampling position at the current moment based on a matching result; and obtaining a high-precision position of the vehicle based on the probability that the vehicle is located at each sampling position at the current moment.

In an embodiment, a method comprises: obtaining a Global Navigation Satellite System (GNSS) position of a vehicle; obtaining, based on the GNSS position of the vehicle, standard positioning data around a road where the vehicle is located from preset standard positioning data, wherein the standard positioning data comprises laser point data of key points of road objects with stable attributes on or by either side of the road; obtaining laser point cloud data, outputted by a laser sensor of the vehicle, around the road where the vehicle is located; extracting to-be-matched positioning data around the road where the vehicle is located from the laser point cloud data, wherein the to-be-matched positioning data comprises laser point data of key points of at least one road object with a stable attribute on or by either side of the road where the vehicle is located; forward simulating a motion state of the vehicle based on more than one sampling positions corresponding to the vehicle at a previous moment, to obtain more than one sampling positions corresponding to the vehicle at a current moment; converting the to-be-matched positioning data into a coordinate system corresponding to the standard positioning data based on the more than one sampling positions corresponding to the vehicle at the current moment; matching the to-be-matched positioning data in the converted coordinate system with the standard positioning data, to obtain a probability that the vehicle is located at each sampling position corresponding to the vehicle at the current moment based on a matching result; and obtaining a position of the vehicle based on the probability that the vehicle is located at each sampling position corresponding to the vehicle at the current moment.

In an embodiment, the extracting to-be-matched positioning data around the road where the vehicle is located from the laser point cloud data comprises: classifying the laser point cloud data as road-surface laser point cloud data and/or road-side laser point cloud data; and extracting laser point data of key points of at least one road object on the road from the road-surface laser point cloud data or at least one road object by either side of the road from the road-side laser point cloud data.

In an embodiment, before the extracting the laser point data of the key points of the at least one road object, the method further comprises: fitting a road surface of the road according to the road-surface laser point cloud data; and adjusting, based on the fitted road surface, height values of laser points in the road-surface laser point cloud data and/or the road-side laser point cloud data to height values relative to the fitted road surface.

In an embodiment, the at least one road object comprises a ground marking on the road, and the extracting the laser point data of the key points of the at least one road object on the road from the road-surface laser point cloud data comprises: dividing the road-surface laser point cloud data into a plurality of grid cells according to a preset grid cell size; and if road-surface laser point cloud data in a grid cell of the plurality of grid cells comprises laser point data of the ground marking, obtaining laser point data of a key point of the ground marking based on the laser point data of the ground marking in the grid cell.

In an embodiment, the at least one road object comprises a road edge, and the extracting the laser point data of the key points of the at least one road object by either side of the road from the road-side laser point cloud data comprises: dividing the road-side laser point cloud data into a plurality of grid cells according to a preset grid cell size; if road-side laser point cloud data in a grid cell of the plurality of grid cells comprises laser point data of the road edge, sorting the laser point data of the road edge in ascending order of height values of laser points in the laser point data in the grid cell; if a difference between height values of two adjacent laser points after the sorting is greater than a difference threshold, updating the laser point data in the grid cell by deleting a laser point having a larger height value in the two adjacent laser points and one or more laser points following the laser point having the larger height value from the laser point data in the grid cell; and obtaining laser point data of a key point of the road edge based on the updated laser point data of the road edge in the grid cell.

In an embodiment, the at least one road object comprises an upright object by a side of the road, and the extracting the laser point data of the key points of the at least one road object by either side of the road from the road-side laser point cloud data comprises: dividing the road-side laser point cloud data into a plurality of grid cells according to a preset grid cell size; if road-side laser point cloud data in a grid cell of the plurality of grid cells comprises laser point data of an upright object by a side of the road, sorting the laser point data of the upright object by the side of the road in ascending order of height values of laser points in the laser point data in the grid cell; if a difference between height values of two adjacent laser points after the sorting is greater than a difference threshold, updating the laser point data in the grid cell by deleting a laser point having a larger height value in the two adjacent laser points and one or more laser points following the laser point having the larger height value from the laser point data in the grid cell; and determining whether a smallest height value in the updated laser point data of the upright object is smaller than a first height threshold and whether a largest height value in the updated laser point data of the upright object is greater than a second height threshold, and if the smallest height value is smaller than the first height threshold and the largest height value is greater than the second height threshold, obtaining laser point data of a key point of the upright object based on the updated laser point data of the upright object in the grid cell.

In an embodiment, the matching the to-be-matched positioning data in the converted coordinate system with the standard positioning data, to obtain a probability that the vehicle is located at each sampling position corresponding to the vehicle at the current moment based on a matching result comprises: matching laser point data of key points of road objects of a same type in the to-be-matched positioning data in the converted coordinate system and the standard positioning data, to obtain the probability that the vehicle is located at each sampling position corresponding to the vehicle at the current moment based on the matching result.

In an embodiment, the matching the to-be-matched positioning data in the converted coordinate system with the standard positioning data, to obtain a probability that the vehicle is located at each sampling position corresponding to the vehicle at the current moment based on a matching result comprises: matching laser point data of a key point in the to-be-matched positioning data in the converted coordinate system with laser point data of a key point in the standard positioning data that is the closest to the key point in the to-be-matched positioning data, and calculating a probability that the key point in the to-be-matched positioning data in the converted coordinate system is a same position point as the key point in the standard positioning data that is the closest to the key point in the to-be-matched positioning data; and according to a probability that each key point in the to-be-matched positioning data in the converted coordinate system is a same position point as a key point in the standard positioning data that is the closest to the key point in the to-be-matched positioning data, obtaining a probability that the vehicle is located at a sampling position, and each key point in the to-be-matched positioning data in the converted coordinate system corresponding to the sampling position.

In an embodiment, the obtaining a position of the vehicle based on the probability that the vehicle is located at each sampling position comprises: determining a sampling position with a highest probability in probabilities that the vehicle is located at sampling positions including the each sampling position as the position of the vehicle; or performing weighting calculation on each sampling position by using the probability that the vehicle is located at each sampling position as a weight, obtaining a weighted position of the vehicle based on the weighting calculation, and determining the weighted position as the position of the vehicle.

According to a second aspect, a positioning apparatus is provided, including:
 a GNSS position obtaining module, configured to obtain a GNSS position of a vehicle;
 a standard positioning data obtaining module, configured to obtain, based on the GNSS position of the vehicle, standard positioning data around a road where the vehicle is located from preset standard positioning data, where the standard positioning data includes laser point data of key points of an easily recognizable road object with a stable attribute on the road and/or by either side of the road;
 a laser point cloud data obtaining module, configured to obtain laser point cloud data, outputted by a laser sensor of the vehicle, around the road where the vehicle is located;
 a to-be-matched positioning data extraction module, configured to extract to-be-matched positioning data around the road where the vehicle is located from the laser point cloud data, where the to-be-matched positioning data includes laser point data of key points of an easily recognizable road object with a stable attribute on the road and/or by either side of the road where the vehicle is located;
 a sampling position obtaining module, configured to forward simulate a motion state of the vehicle based on more than one sampling positions corresponding to the vehicle at a previous moment, to obtain more than one sampling positions corresponding to the vehicle at a current moment;

a positioning data conversion module, configured to convert the to-be-matched positioning data into a coordinate system corresponding to the standard positioning data based on the more than one sampling positions corresponding to the vehicle at the current moment;

a positioning data matching module, configured to match the to-be-matched positioning data in the converted coordinate system with the standard positioning data, to obtain a probability that the vehicle is located at each sampling position at the current moment based on a matching result; and a high-precision positioning module, configured to obtain a high-precision position of the vehicle based on the probability that the vehicle is located at each sampling position at the current moment.

According to a third aspect, an electronic device is provided, including:

a memory, configured to store a program; and a processor, coupled to the memory and configured to execute the program, the program, when run, performing the positioning method provided in this specification.

According to a fourth aspect, a system for positioning is provided. The system comprises a processor and a non-transitory computer-readable storage medium storing instructions executable by the processor to cause the system to perform operations, the operations comprising: obtaining a Global Navigation Satellite System (GNSS) position of a vehicle; obtaining, based on the GNSS position of the vehicle, standard positioning data around a road where the vehicle is located from preset standard positioning data, wherein the standard positioning data comprises laser point data of key points of road objects with stable attributes on or by either side of the road; obtaining laser point cloud data, outputted by a laser sensor of the vehicle, around the road where the vehicle is located; extracting to-be-matched positioning data around the road where the vehicle is located from the laser point cloud data, wherein the to-be-matched positioning data comprises laser point data of key points of at least one road object with a stable attribute on or by either side of the road where the vehicle is located; forward simulating a motion state of the vehicle based on more than one sampling positions corresponding to the vehicle at a previous moment, to obtain more than one sampling positions corresponding to the vehicle at a current moment; converting the to-be-matched positioning data into a coordinate system corresponding to the standard positioning data based on the more than one sampling positions corresponding to the vehicle at the current moment; matching the to-be-matched positioning data in the converted coordinate system with the standard positioning data, to obtain a probability that the vehicle is located at each sampling position corresponding to the vehicle at the current moment based on a matching result; and obtaining a position of the vehicle based on the probability that the vehicle is located at each sampling position corresponding to the vehicle at the current moment.

According to a fifth aspect, a non-transitory computer-readable storage medium for positioning is provided. The medium is configured with instructions executable by one or more processors to cause the one or more processors to perform operations, the operations comprising: obtaining a Global Navigation Satellite System (GNSS) position of a vehicle; obtaining, based on the GNSS position of the vehicle, standard positioning data around a road where the vehicle is located from preset standard positioning data, wherein the standard positioning data comprises laser point data of key points of road objects with stable attributes on or by either side of the road; obtaining laser point cloud data, outputted by a laser sensor of the vehicle, around the road where the vehicle is located; extracting to-be-matched positioning data around the road where the vehicle is located from the laser point cloud data, wherein the to-be-matched positioning data comprises laser point data of key points of at least one road object with a stable attribute on or by either side of the road where the vehicle is located; forward simulating a motion state of the vehicle based on more than one sampling positions corresponding to the vehicle at a previous moment, to obtain more than one sampling positions corresponding to the vehicle at a current moment; converting the to-be-matched positioning data into a coordinate system corresponding to the standard positioning data based on the more than one sampling positions corresponding to the vehicle at the current moment; matching the to-be-matched positioning data in the converted coordinate system with the standard positioning data, to obtain a probability that the vehicle is located at each sampling position corresponding to the vehicle at the current moment based on a matching result; and obtaining a position of the vehicle based on the probability that the vehicle is located at each sampling position corresponding to the vehicle at the current moment.

This specification provides a positioning method, an apparatus, and an electronic device. The method includes: obtaining, based on an obtained GNSS position of a vehicle, standard positioning data around a road where the vehicle is located from preset standard positioning data; obtaining laser point cloud data, outputted by a laser sensor of the vehicle, around the road where the vehicle is located, and extracting to-be-matched positioning data around the road where the vehicle is located from the laser point cloud data, where both the standard positioning data and the to-be-matched positioning data include laser point data of key points of an easily recognizable road object with a stable attribute on the road and/or by either side of the road where the vehicle is located; forward simulating a motion state of the vehicle based on more than one sampling positions corresponding to the vehicle at a previous moment, to obtain more than one sampling positions corresponding to the vehicle at a current moment, and converting the to-be-matched positioning data into a coordinate system corresponding to the standard positioning data based on the more than one sampling positions corresponding to the vehicle at the current moment; matching the to-be-matched positioning data in the converted coordinate system with the standard positioning data, to obtain a probability that the vehicle is located at each sampling position based on a matching result; and obtaining a high-precision position of the vehicle based on the probability that the vehicle is located at each sampling position. The road object in this specification is an easily recognizable road object with a stable attribute on the road and/or by either side of the road, and such a road object generally does not change as an environment changes or as time goes by. Therefore, by using extracted laser point data of key points of the easily recognizable road object with a stable attribute on the road and/or by either side of the road as matching objects of high-precision positioning, a positioning success rate and the positioning accuracy can be ensured. In addition, in this specification, only the laser point data of the key points of the road object is extracted for matching. Therefore, a data volume is smaller, thereby greatly reducing a calculation amount and improving the positioning efficiency.

The foregoing description is merely an overview of the technical solutions of this specification. To understand the technical solutions of this specification more clearly, implementation can be performed according to embodiments of the specification. Moreover, to make the foregoing and other objectives, features, and advantages of this specification more comprehensible, embodiments of this specification are described below.

BRIEF DESCRIPTION OF THE DRAWINGS

Following detailed description of embodiments describes various advantages and benefits clearly to a person of ordinary skill in the art. The accompanying drawings are merely used for illustrating some embodiments and are not to constitute limitations on this specification. Throughout the accompanying drawings, the same reference numerals are used to represent the same components.

DETAILED DESCRIPTION

Figure 1A:
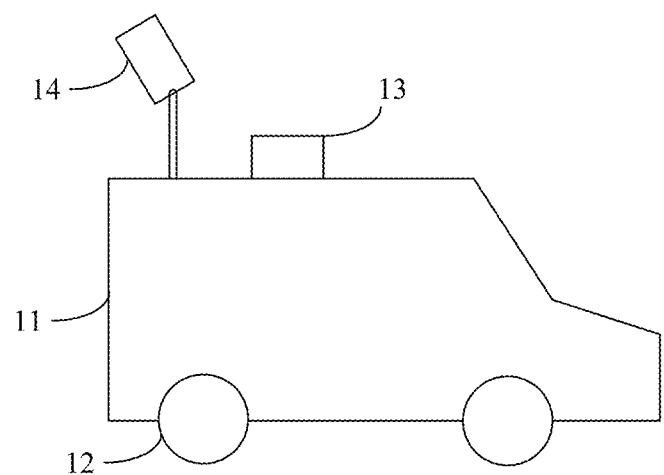
FIG. 1a is a schematic structural diagram of an apparatus for acquiring laser point cloud data, according to an embodiment of this specification.

The following describes details of embodiments of this specification with reference to the accompanying drawings. The accompanying drawings show some embodiments of this specification, and this specification may be implemented in various manners and is not limited by the embodiments described herein. Rather, these embodiments are provided, so that this specification is more thoroughly understood and the scope of this specification is completely conveyed to a person skilled in the art.

To implement high-precision positioning of an automobile, positioning data used in a high-precision positioning scenario needs to be generated, and the positioning data needs to meet the following several requirements.

Information amount: An information amount of the positioning data needs to be rich enough to represent a road on which the automobile travels and an environment around the automobile, as vivid as possible.

Data volume: A data volume of the positioning data needs to be as small as possible, so as to facilitate the storage and transmission.

Robustness: The positioning data is robust enough to external environments such as lighting, time, seasons, climate, and road conditions, and is not prone to the impact of changes in the external environments.

In comprehensive consideration of the foregoing requirements, this specification provides a positioning data generation method. The method includes:

obtaining laser point cloud data in a preset regional range on a road and/or by either side of the road;

extracting laser point data of key points of a road object on the road and/or by either side of the road from the laser point cloud data, where the road object is an easily recognizable road object with a stable attribute on the road and/or by either side of the road; and storing the extracted laser point data of the key points as positioning data of the road.

During an actual application, the easily recognizable road object with a stable attribute on the road and/or by either side of the road may be a ground marking, a road edge, or an upright object by a side of the road.

The ground marking may be any marking on a road surface, such as a lane line, a road direction arrow, or a crosswalk. The road edge may be formed by curbs, guard rails, or green belts. The upright object by a side of the road may be an upright object by either side of the road, such as a pole (a support pole of a traffic sign, a street lamp, or a traffic light), a tree trunk, or a wall by either side of the road.

A road object such as a ground marking, a road edge, or an upright object by a side of the road is not prone to the impact of external environments such as lighting, time, seasons, climate, and road conditions. Positioning is matching environmental information obtained in real time when a vehicle travels with positioning data, so as to determine a position of the vehicle. Therefore, laser point data of key points of an easily recognizable road object with a stable attribute on a road and/or by either side of a road is extracted as the positioning data, to ensure a positioning success rate. In addition, in this specification, only the laser point data of the key points is extracted. Therefore, a data volume is smaller, for facilitating the storage and transmission of the data.

FIG. 1a is a schematic structural diagram of an apparatus for acquiring laser point cloud data, according to an embodiment of this specification. The apparatus includes: an acquiring vehicle body 11, wheels 12 provided with a revolution counter, an integrated positioning system 13 integrated with an inertial measurement unit (IMU) and a GNSS, and a laser radar 14 configured to acquire laser point cloud data. The apparatus structure shown in FIG. 1a can acquire laser point cloud data of all objects on a road and two sides of the road where the acquiring vehicle has traveled. The positioning data with a smaller data volume and a high positioning success rate can be obtained by processing the acquired laser point cloud data using the technical solution for generating positioning data shown in FIG. 1b.

Figure 1B:
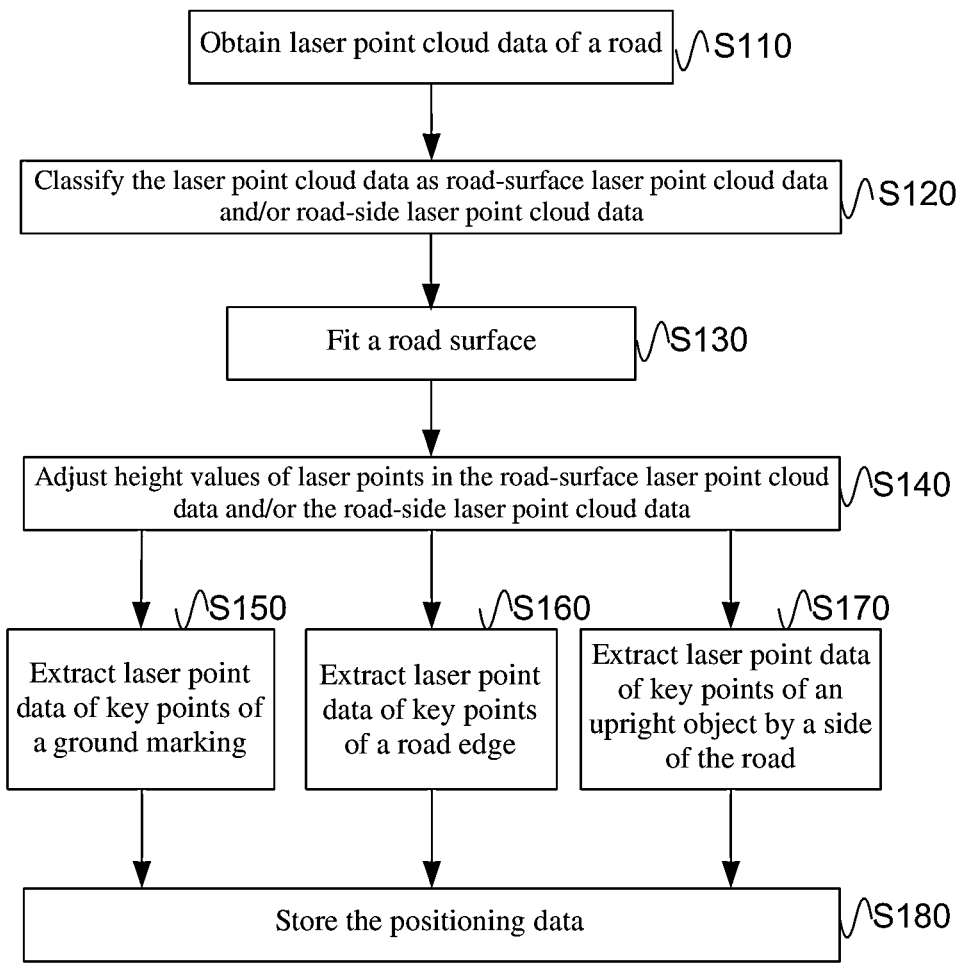
FIG. 1b is a schematic diagram of a technical solution for generating positioning data, according to an embodiment of this specification.

As shown in FIG. 1b, the technical solution for generating positioning data includes the following technical features.

S110: Obtaining laser point cloud data of a road. The laser point cloud data includes laser point data in a preset regional range on the road and/or by either side of the road.

S120: Classifying the laser point cloud data as road-surface laser point cloud data and/or road-side laser point cloud data.

The process of classifying the laser point cloud data as laser point cloud data on a road surface, on the left side of the road, or on the right side of the road may include obtaining ground catastrophe points corresponding to scan lines of laser points obtained by scanning of a laser radar, and boundary positions of laser point clouds on the road surface and/or on two sides of the road can be distinguished according to the catastrophe points. If the laser point cloud data obtained in step S110 includes both the laser point data in the preset regional range on the road and by either side of the road, the road-surface laser point cloud data and the road-side laser point cloud data may be obtained in step S120. If the laser point cloud data obtained in step S110 includes the laser point data in the preset regional range only on the road or only by either side of the road, the road-surface laser point cloud data or the road-side laser point cloud data may be obtained in step S120.

S130: Fitting a road surface. Plane fitting is performed on the road-surface laser point cloud data by using a random sample consensus (RANSAC) algorithm, to obtain a fitted road surface.

S140: Adjusting, based on the fitted road surface, height values of laser points in the road-surface laser point cloud data and/or the road-side laser point cloud data to height values relative to the road surface.

If a height coordinate value Z of each laser point in the inputted laser point cloud data is already a value Z relative to the road surface, step 130 and step 140 may be omitted. Next, laser point data of key points of a road object on the road and/or by either side of the road is correspondingly extracted from the road-surface laser point cloud data and/or road-side laser point cloud data.

The extracting laser point data of key points of a road object on the road and/or by either side of the road includes followings.

S150: Extracting laser point data of key points of a ground marking. Laser point data of key points of a ground marking is extracted from the road-surface laser point cloud data.

S160: Extracting laser point data of key points of a road edge. Laser point data of key points of a road edge is extracted from the road-side laser point cloud data.

S170: Extracting laser point data of key points of an upright object by a side of the road. Laser point data of key points of an upright object by a side of the road is extracted from the road-side laser point cloud data.

S180: Storing the extracted laser point data of the key points as the positioning data of the road.

Laser point cloud data of key points of a ground marking, key points of a road edge, and key points of an upright object by a side of the road that is extracted from the laser point cloud data is stored as the positioning data. In this specification, the stored positioning data may include the laser point cloud data of the key points of at least one of the ground marking, the road edge, and the upright object by a side of the road.

Based on the positioning data generated by using the positioning data generation method, this specification provides a positioning method. The method includes:

obtaining a GNSS position of a vehicle;

obtaining, based on the GNSS position of the vehicle, standard positioning data around a road where the vehicle is located from preset standard positioning data, where the standard positioning data includes laser point data of key points of easily recognizable road objects with stable attributes on the road and/or by either side of the road;

obtaining laser point cloud data, outputted by a laser sensor of the vehicle, around the road where the vehicle is located;

extracting to-be-matched positioning data around the road where the vehicle is located from the laser point cloud data, where the to-be-matched positioning data includes laser point data of key points of at least an easily recognizable road object with a stable attribute on the road and/or by either side of the road where the vehicle is located;

forward simulating a motion state of the vehicle based on more than one sampling positions corresponding to the vehicle at a previous moment, to obtain more than one sampling positions corresponding to the vehicle at a current moment;

converting the to-be-matched positioning data into a coordinate system corresponding to the standard positioning data based on the more than one sampling positions corresponding to the vehicle at the current moment;

matching the to-be-matched positioning data in the converted coordinate system with the standard positioning data, to obtain a probability that the vehicle is located at each sampling position corresponding to the vehicle at the current moment based on a matching result; and obtaining a high-precision position of the vehicle based on the probability that the vehicle is located at each sampling position.

In the positioning method provided in this specification, the positioning data obtained by processing, using the technical solution for generating positioning data shown in FIG. 1b, the laser point cloud data acquired by a designated apparatus for acquiring laser point cloud data shown in FIG. 1a is used as standard positioning data. To-be-matched positioning data is extracted from laser point cloud data, outputted by a laser sensor of a to-be-positioned vehicle, around a road where the vehicle is located. Both the standard positioning data and the to-be-matched positioning data include laser point data of key points of at least an easily recognizable road object with a stable attribute on the road and/or by either side of the road. A difference lies in that the standard positioning data is already explicitly positioned in a GNSS coordinate system, and may be used as standard positioning values, while the to-be-matched positioning data is only accurate positioning data that is relative to a laser sensor coordinate system and is outputted by the laser sensor of the to-be-positioned vehicle. Before position matching is performed on the standard positioning data and the to-be-matched positioning data to obtain a high-precision position of the vehicle, a rough position (in the GNSS coordinate system) of the vehicle needs to be determined to convert the to-be-matched positioning data into the coordinate system corresponding to the standard positioning data.

In this specification, standard positioning data around a road where the vehicle is located is obtained from preset standard positioning data by obtaining a GNSS position of a vehicle. A motion state of the vehicle is forward simulated based on more than one sampling positions corresponding to the vehicle at a previous moment, to obtain more than one sampling positions corresponding to the vehicle at a current moment. The to-be-matched positioning data is then converted into a coordinate system corresponding to the standard positioning data based on the sampling positions. The to-be-matched positioning data in the converted coordinate system is matched with the standard positioning data, to obtain a probability that the vehicle is located at each sampling position corresponding to the vehicle at the current moment based on a matching result. Finally, a high-precision position of the vehicle is obtained based on the probability that the vehicle is located at each sampling position corresponding to the vehicle at the current moment.

Figure 2:
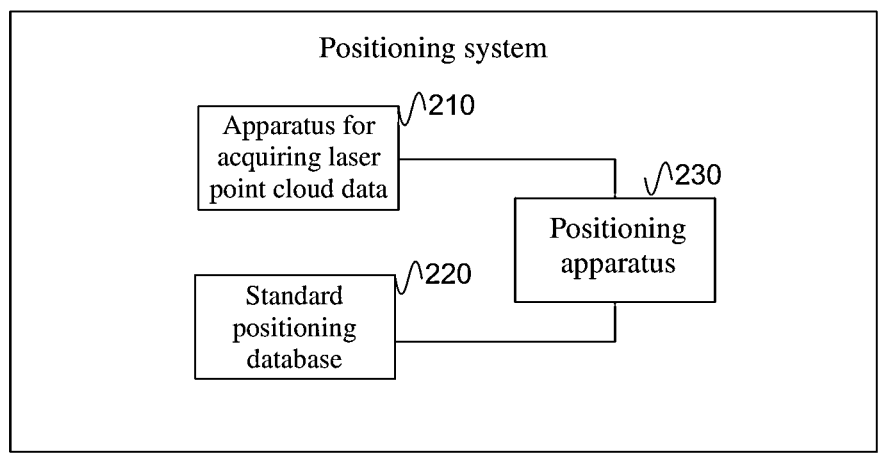
FIG. 2 is a structural diagram of a positioning system, according to an embodiment of this specification.

FIG. 2 is a structural diagram of a positioning system, according to this specification. The system includes an apparatus 210 for acquiring laser point cloud data, a standard positioning database 220, and a positioning apparatus 230.

The apparatus 210 for acquiring laser point cloud data may be, but is not limited to, the apparatus structure shown in FIG. 1a (correspondingly, the acquiring vehicle body 11 may be a to-be-positioned vehicle), and is configured to: acquire laser point cloud data on a road and/or by either side of the road, and position a GNSS position of the vehicle.

The standard positioning database 220 stores standard positioning data used for road positioning.

The positioning apparatus 230 is configured to: extract to-be-matched positioning data around the road where the vehicle is located from the laser point cloud data acquired by the apparatus 210 for acquiring laser point cloud data, and obtain the GNSS position of the vehicle; obtain, based on the GNSS position of the vehicle, standard positioning data around the road where the vehicle is located from preset standard positioning data; forward simulate a motion state of the vehicle based on more than one sampling positions corresponding to the vehicle at a previous moment, to obtain more than one sampling positions corresponding to the vehicle at a current moment, and convert the to-be-matched positioning data into a coordinate system corresponding to the standard positioning data based on the more than one sampling positions corresponding to the vehicle at the current moment; and match the to-be-matched positioning data in the converted coordinate system with the standard positioning data, to obtain a probability that the vehicle is located at each sampling position corresponding to the vehicle at the current moment based on a matching result, and obtain a high-precision position of the vehicle based on the probability that the vehicle is located at each sampling position corresponding to the vehicle at the current moment.

Both the standard positioning data and the to-be-matched positioning data include laser point data of key points of easily recognizable road objects with stable attributes on the road and/or by either side of the road. For example, the road objects may include at least one road object of a ground marking on the road, a road edge, and an upright object by a side of the road, and such a road object generally does not change as an environment changes or as time goes by. A positioning success rate can be ensured by using laser point data of key points of such road objects as positioning data of the road. In addition, in this specification, only the laser point data of the key points of the road objects is extracted for matching.

Therefore, a data volume is smaller, thereby greatly reducing a calculation amount and improving the positioning efficiency. The technical solutions of this specification are further described in the embodiments below.

Embodiment 1

Figure 3A:
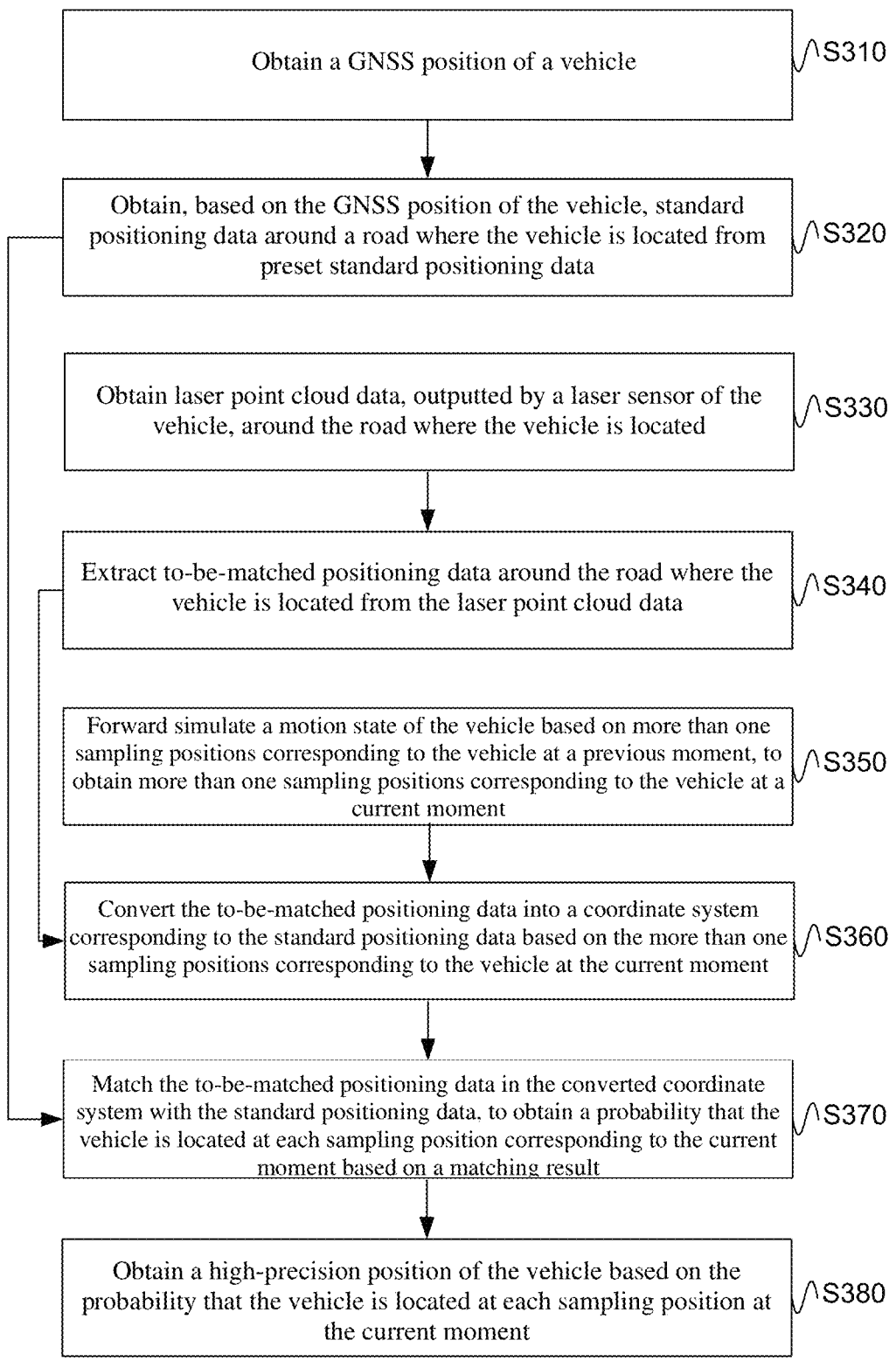
FIG. 3a is flowchart 1 of a positioning method, according to an embodiment of this specification.

Based on the concept of the foregoing positioning solution, FIG. 3a is flowchart 1 of a positioning method, according to an embodiment of this specification, and an execution entity of the method may be the positioning apparatus 230 shown in FIG. 2. As shown in FIG. 3a, the positioning method may include the following steps.

S310: Obtaining a GNSS position of a vehicle.

A GNSS positioning system may be disposed on a to-be-positioned vehicle for positioning the vehicle in real time, to obtain a GNSS position of the vehicle.

S320: Obtaining, based on the GNSS position of the vehicle, standard positioning data around a road where the vehicle is located from preset standard positioning data, where the standard positioning data includes laser point data of key points of easily recognizable road objects with stable attributes on the road and/or by either side of the road.

After the GNSS position of the vehicle is obtained, a geographic position of the vehicle may be roughly determined. Standard positioning data around a road where the vehicle is located is obtained from a preset standard positioning database based on the GNSS position of the vehicle. The standard positioning data may be obtained by using the technical solution shown in FIG. 1, and includes laser point data of key points of easily recognizable road objects with stable attributes on the road and/or by either side of the road. Each piece of laser point data corresponds to explicit position coordinates in a GNSS coordinate system.

The road objects may include a ground marking, a road edge, or an upright object by a side of the road.

S330: Obtaining laser point cloud data, outputted by a laser sensor of the vehicle, around the road where the vehicle is located.

Generally, a laser point cloud at an extremely far position (tens of meters to hundreds of meters) may be obtained through laser radar scanning, and the precision of a laser point cloud far away from an acquisition site is lower, and is not a laser point at a road position. Therefore, during acquisition of the laser point cloud data, an acquiring vehicle body may be used as a center, and the acquired laser point cloud far away from the acquiring vehicle body is directly filtered out only to limit a range to reduce the amount of the laser point cloud data. At this point, whether the laser point cloud data belongs to the ground or does not belong to the ground is not distinguished.

Figure 3B:
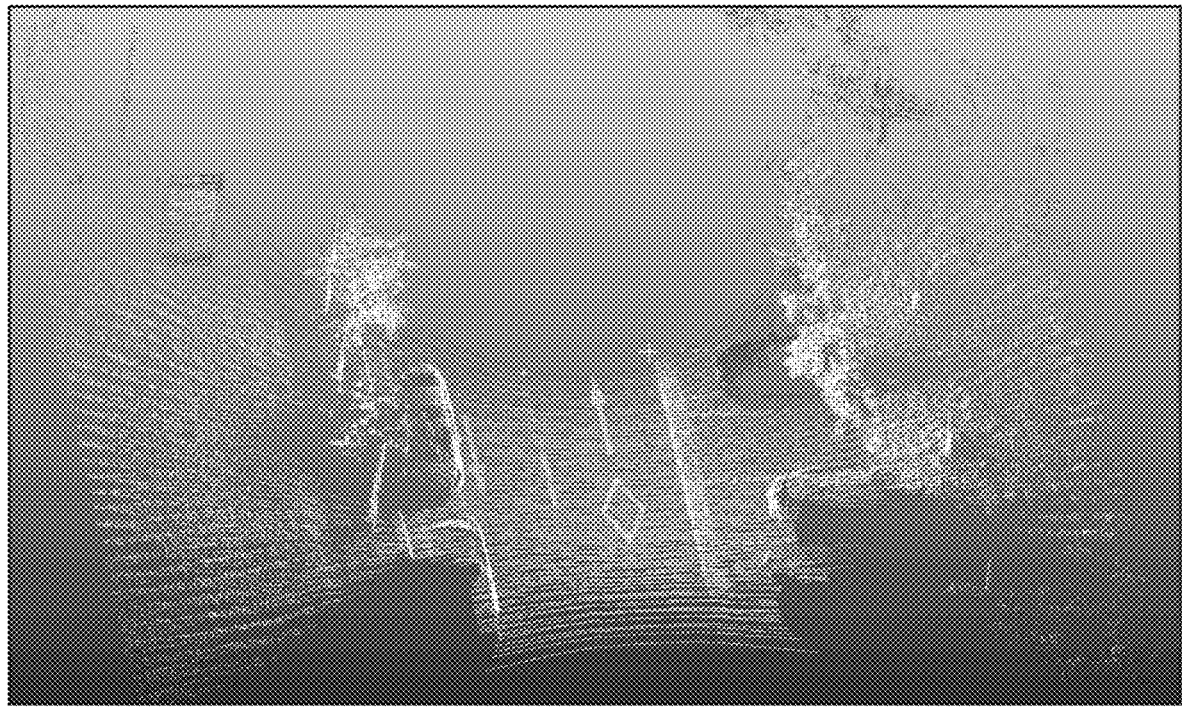
FIG. 3b is a schematic diagram of a laser point cloud, according to an embodiment of this specification.

During the actual acquisition of the laser point cloud data around the road where the vehicle is located, laser point cloud data around the road where the vehicle is located at a current moment may be periodically obtained, according to a processing period for generating a high-precision position and from the laser point cloud data outputted by the laser sensor of the vehicle. FIG. 3b is a laser point cloud map of laser point cloud data in a preset regional range around the road where the vehicle is located corresponding to a moment. Each piece of laser point data in the figure includes three-dimensional coordinates (x, y, z) (located in the laser sensor coordinate system), and a brightness degree of each laser point represents the reflectivity of the laser point, where the reflectivity of a laser point in a middle region of the road surface is higher than the reflectivity of a laser point by either side of the road.

S340: Extracting to-be-matched positioning data around the road where the vehicle is located from the laser point cloud data, where the to-be-matched positioning data includes laser point data of key points of at least an easily recognizable road object with a stable attribute on the road and/or by either side of the road where the vehicle is located.

To ensure the consistency of a road object in the to-be-matched positioning data and in the standard positioning data, after obtaining the laser point cloud data outputted by the laser sensor of the vehicle around the road where the vehicle is located, the laser point data of key points of at least an easily recognizable road object with a stable attribute on the road and/or by either side of the road where the vehicle is located needs to be extracted from the laser point cloud data.

The road objects may include, but is not limited to, a ground marking, a road edge, and an upright object by a side of the road. Correspondingly, the laser point data of key points of a road object may be the laser point data of key points that is extracted from the laser point cloud data of the road object, where the key points are key points that can reflect morphological features of the road object to the greatest extent.

For example, laser point data of key points of a ground marking, a road edge, an upright object by a side of the road, and the like may be extracted from the laser point cloud data in a preset regional range on the road and/or by either side of the road by combining reflectivity of laser points and three-dimensional coordinates (especially height values of the laser points).

For example, by using a method for generating standard positioning data, the to-be-matched positioning data may be obtained from the laser point cloud data outputted by a laser sensor of a to-be-positioned vehicle and around a road where the vehicle is located. In this way, if the to-be-matched positioning data and the standard positioning data are the laser point data of key points of road objects in the same geographical region, distributions of the two types of positioning data may have a high similarity. A difference only lies in that, the standard positioning data is explicitly positioned and has accurate GNSS positioning coordinates, while the to-be-matched positioning data is only explicitly positioned in a laser sensor coordinate system and is roughly positioned by using a GNSS positioning system (mainly because the precision of the GNSS positioning system used by a user is not high). Consequently, a high-precision position of the vehicle needs to be finally determined by using a matching result between the to-be-matched positioning data and the standard positioning data.

S350: Forward simulating a motion state of the vehicle based on more than one sampling positions corresponding to the vehicle at a previous moment, to obtain more than one sampling positions corresponding to the vehicle at a current moment.

When the to-be-matched positioning data of the vehicle and the standard positioning data are matched periodically, more than one sampling positions may be set for the vehicle at a current moment in each period. The sampling positions represent positions where the vehicle may appear in the corresponding period.

For example, during determination of more than one sampling positions of the vehicle at the current moment, a motion state of the vehicle may be forward simulated to move more than one sampling positions corresponding to the vehicle at a previous moment to positions at the current moment, so as to obtain the more than one sampling positions at the current moment. Sampling positions of the vehicle at an initial moment are more than one position points selected from a positioning region where a GNSS position of the vehicle is located at the initial moment.

In an actual application scenario, a motion of the vehicle is simulated based on more than one sampling positions corresponding to the vehicle at the previous moment in a combination with vehicle kinematics, data measured via an IMU, and an apparatus such as a revolution counter, to obtain possible sampling positions of the vehicle at the current moment. If the current moment is the initial moment at which the sampling positions are obtained, the more than one possible sampling positions of the vehicle at the current moment may be obtained by directly performing sampling in a positioning region where positions outputted by the GNSS positioning system are located.

Forward simulating the motion of the vehicle is implemented based on a vehicle kinematic equation. For example, an example of forward simulation is provided below:

$$\begin{bmatrix} p_{x_{k+1}} \\ p_{y_{k+1}} \end{bmatrix} = \begin{bmatrix} p_{x_k} \\ p_{y_k} \end{bmatrix} + \begin{bmatrix} \frac{v_k}{\varphi_k}(\sin(\varphi_k + \overline{\varphi}_k \Delta t) + \sin(\varphi_k)) \\ \frac{v_k}{\varphi_k}(-\cos(\varphi_k + \overline{\varphi}_k \Delta t) + \cos(\varphi_k)) \end{bmatrix} + v_k \quad (1)$$

In the formula (1), a rotational angular velocity and a movement speed of the vehicle in a short time are assumed to be constant in the model. $p_{x_k}$ and $p_{y_k}$ respectively represent coordinates of the vehicle in the x direction and the y direction of a plane coordinate system at a moment k, $v_k$, $\varphi_k$, and $\bar{\varphi}_k$ respectively represent a speed, a heading angle, and a change rate of the heading angle of the vehicle at the moment k, $\Delta t$ represents a time difference between the moment k to a moment (k+1), and $v_k$ represents model noise at the moment k.

In this way, more than one sampling positions of the vehicle at each moment (excluding the initial moment) may be obtained by forward simulating the motion state of the vehicle.

S360: Converting the to-be-matched positioning data into a coordinate system corresponding to the standard positioning data based on the more than one sampling positions corresponding to the vehicle at the current moment.

After position coordinates of the sampling positions of the vehicle are determined in a coordinate system corresponding to the standard positioning data, the corresponding to-be-matched positioning data obtained at the same moment may be converted into the coordinate system corresponding to the standard positioning data, to obtain corresponding position coordinate values.

S370: Matching the to-be-matched positioning data in the converted coordinate system with the standard positioning data, to obtain a probability that the vehicle is located at each sampling position corresponding to the current moment based on a matching result.

For each sampling position, a group of to-be-matched positioning data exists in the converted coordinate system. Matching is performed on the to-be-matched positioning data and the standard positioning data, so that a probability that the vehicle appears at the sampling positions may be determined based on a matching result, that is, a matching degree of laser point data in the to-be-matched positioning data in the converted coordinate system and the standard positioning data.

S380: Obtaining a high-precision position of the vehicle based on the probability that the vehicle is located at each sampling position at the current moment.

For example, a sampling position with the highest probability in the probability that the vehicle is located at each sampling position may be determined as the high-precision position of the vehicle, or weighting calculation may be performed on corresponding sampling positions by using the probability that the vehicle is located at each sampling position as a weight, and an obtained weighted position may be determined as the high-precision position of the vehicle.

Embodiment 2

Figure 4A:
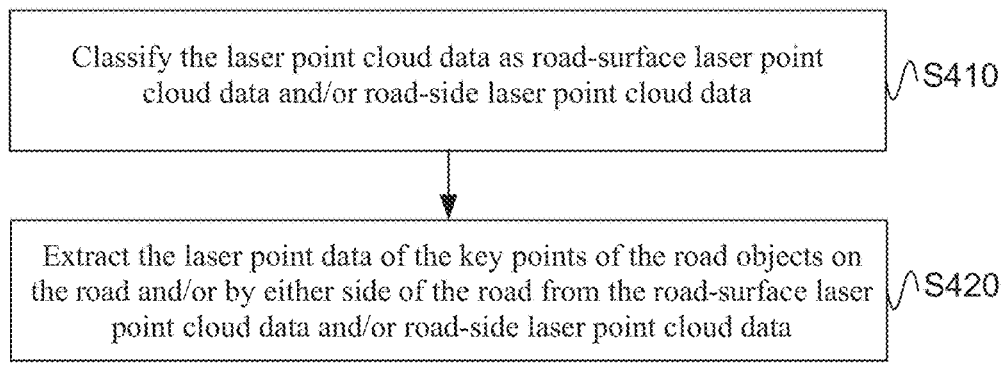
FIG. 4a is flowchart 1 of a method for extracting to-be-matched positioning data, according to an embodiment of this specification.

FIG. 4a is flowchart 1 of a method for extracting to-be-matched positioning data, according to an embodiment of this specification. This embodiment may be used as an implementation of extracting to-be-matched positioning data around the road where the vehicle is located from the laser point cloud data in the method shown in FIG. 3a. As shown in FIG. 4a, the foregoing step S340 may include the following steps.

S410: classifying the laser point cloud data as road-surface laser point cloud data and/or road-side laser point cloud data.

For example, the laser point cloud data around the road where the vehicle is located obtained in step S330 is classified as road-surface laser point cloud data and/or road-side (including the left side and the right side of the road) laser point cloud data according to the positions of three-dimensional coordinate values and a feature of the height change value (Z value in three-dimensional coordinates).

In an actual application scenario, a height catastrophe point of a laser point cloud is found from each laser radar scan line. For example, in laser point cloud data in one grid cell, when a laser point height difference between the highest point and the lowest point in a laser point cloud on the scan line is greater than a specific threshold, for example, 0.1 m, it is considered that a height catastrophe point of the laser point cloud on the scan line exists in the grid cell. In another example, in laser point cloud data in two adjacent grid cells, when a height difference between the highest point and the lowest point in a laser point cloud on the scan line is greater than a specific threshold, it may also be considered that a height catastrophe point of the laser point cloud on the scan line exists in the two grid cells. Height catastrophe points in laser point clouds on scan lines are recognized by extending the scan lines from middle positions of the scan lines corresponding to the laser point cloud data around the road where the vehicle is located toward two sides, and further laser point cloud data on one scan line may be classified as the road-surface laser point cloud data and/or the road-side laser point cloud data.

For each scan line, the scan line is approximately perpendicular to a traveling direction of the vehicle, and the scan line is extended from the middle of the scan line toward the left side and the right side, to find height catastrophe points of laser point clouds on scan lines on the left side and the right side, thereby implementing division of road-surface laser point cloud data and road-side laser point cloud data on one scan line. The same operation is performed on a plurality of scan lines, to classify the laser point cloud data around the road where the vehicle is located as the road-surface laser point cloud data and/or the road-side laser point cloud data.

Figure 4B:
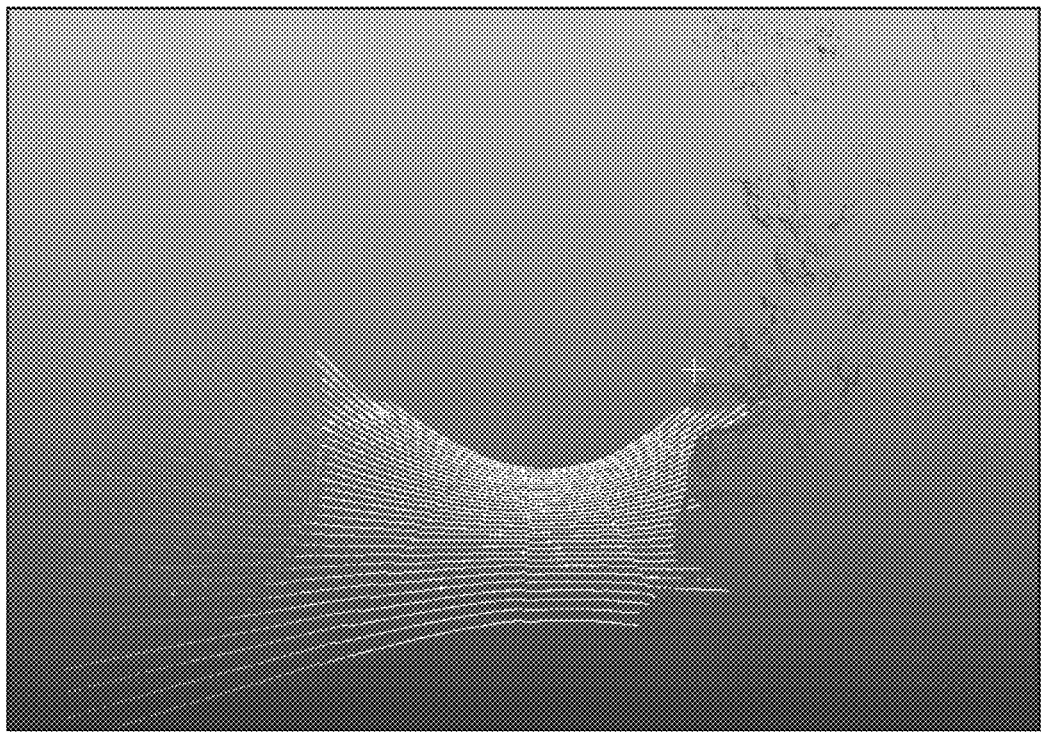
FIG. 4b is a scan line map of an original laser point cloud, according to an embodiment of this specification.

As shown in FIG. 4b, each scan line is approximately a circular arc line when viewed from the left to the right, and a position point in the middle of the scan line is a position of a laser point that the vehicle has passed or is about to pass. The laser point is certainly a laser point on the road surface. The scan line is extended from the middle toward two sides. If a height change value of two adjacent laser points is greater than a height threshold, it is considered that a position of the laser point is at a road edge, and the extension is stopped. Laser point clouds on the scan line are divided from the positions at the road edge. Scan lines of all laser point clouds corresponding to the laser point cloud data around the road where the vehicle is located are divided, so that laser point cloud data in three regions shown in FIG. 4b may be obtained, which are, sequentially from left to right, laser point cloud data by the left side of the road, road-surface laser point cloud data, and laser point cloud data by the right side of the road.

S420: Extracting the laser point data of the key points of the road objects on the road and/or by either side of the road from the road-surface laser point cloud data and/or road-side laser point cloud data.

After the laser point cloud data is divided into different regions, laser point data of key points of road objects may be extracted from the laser point cloud data corresponding to different regions. For example, laser point data of key points of a ground marking is extracted from the road-surface laser point cloud data, and laser point data of key points of a road edge and an upright object is extracted from the road-side laser point cloud data.

Figure 5:
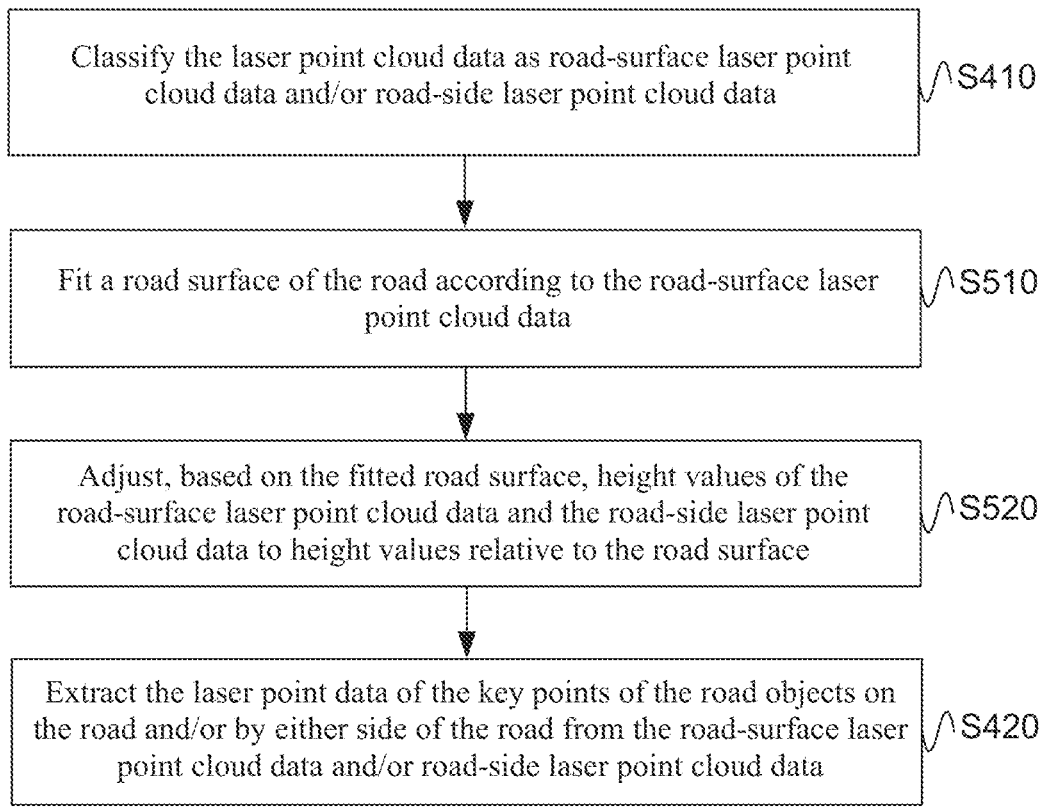
FIG. 5 is flowchart 2 of a method for extracting to-be-matched positioning data, according to an embodiment of this specification.

In addition, as shown in FIG. 5, before step S420 is performed, the following steps may further be performed, so that height correction is performed on the laser point cloud data according to a fitted road surface.

S510: Fitting a road surface of the road according to the road-surface laser point cloud data.

For example, plane fitting may be performed on the road-surface laser point cloud data by using a RANSAC algorithm, to obtain a road surface of the road.

For example, a horizontal plane may be fitted specific to the road-surface laser point cloud data by using a RANSAC plane fitting algorithm, and a part of the horizontal plane located in a road region is the road surface. Specific fitting steps are as follows:

(a) randomly extracting three data points $P_1$, $P_2$, and $P_3$ from the road-surface laser point cloud data;

(b) generating a plane by using the three data points, calculating distances between all pieces of road-surface laser point data and the plane, and calculating a quantity of laser points in a specific distance range (for example, 5 cm); and (c) repeating the foregoing steps several times, and determining a plane formed by three points having the largest quantity of road-surface laser point data in a specific distance range of the plane formed by the three points as a horizontal plane. A part of the horizontal plane located in a road region is the road surface.

S520: Adjusting, based on the fitted road surface, height values of the road-surface laser point cloud data and the road-side laser point cloud data to height values relative to the road surface.

For example, if a height value of the road surface is set to height 0, height values of the road-surface laser point cloud data and the road-side laser point cloud data may be adjusted to a distance between the corresponding laser points and the road surface.

In addition, if a value Z in the inputted laser point cloud data is already a value Z relative to the road surface, step S510 and step S520 do not need to be performed.

Based on the embodiment shown in FIG. 3a, in this embodiment, the laser point cloud data is further classified as the road-surface laser point cloud data and/or road-side laser point cloud data. Next, the laser point data of the key points of the road objects on the road and/or by either side of the road is extracted from the road-surface laser point cloud data and/or road-side laser point cloud data, thereby conveniently and quickly obtaining the laser point data of the key points of the road objects, that is, the to-be-matched positioning data.

In addition, before the laser point data of the key points of the road objects on the road and/or by either side of the road is extracted, a road surface of the road is fitted by using the road-surface laser point cloud data, and height values of the road-surface laser point cloud data and the road-side laser point cloud data are corrected/adjusted to height values relative to the road surface based on the fitted road surface, thereby ensuring the accuracy of height positions of the laser point cloud data.

Embodiment 3

Figure 6:
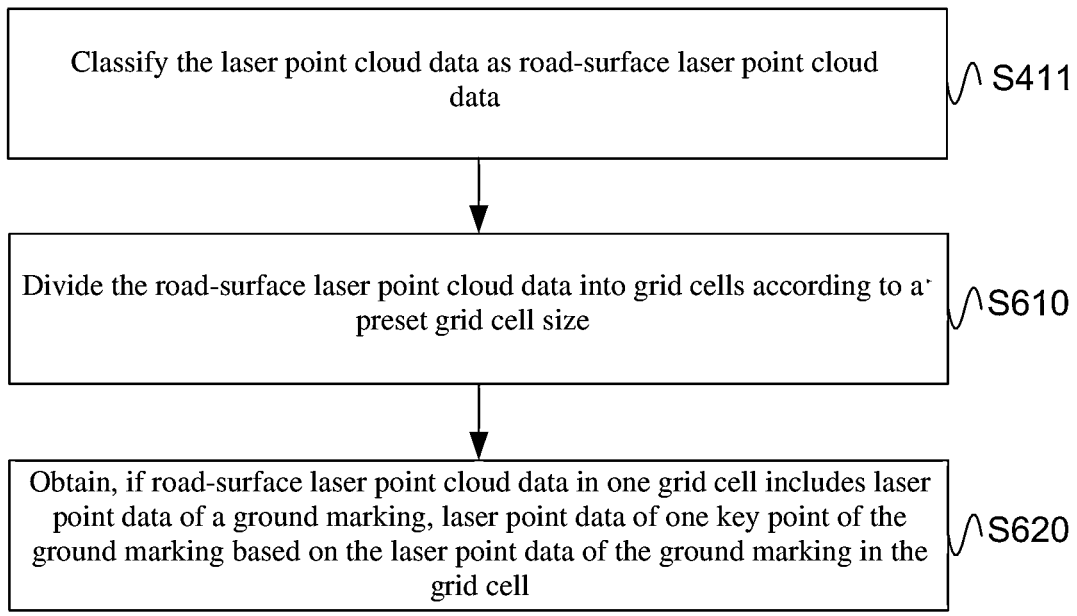
FIG. 6 is flowchart 3 of a method for extracting to-be-matched positioning data, according to an embodiment of this specification.

FIG. 6 is flowchart 3 of a method for extracting to-be-matched positioning data, according to an embodiment of this specification. A difference between this embodiment and the method shown in FIG. 4a lies in that, this embodiment uses an implementation of extracting laser point data of key points of a road object on the road from the road-surface laser point cloud data when the road object is a ground marking on the road. As shown in FIG. 6, the following steps in the method may be first performed.

S411: Classifying the laser point cloud data as road-surface laser point cloud data.

This step may be a specific classification manner of classifying the laser point cloud data in step S410.

S610: Dividing the road-surface laser point cloud data into a plurality of grid cells according to a preset grid cell size.

Preset grid cells may be two-dimensional grid cells set on the horizontal plane, and the entire road-surface laser point cloud data may be divided into different grid cells according to projection relationships between the road-surface laser point cloud data and the grid cells.

S620: Obtaining, if road-surface laser point cloud data in one grid cell includes laser point data of a ground marking, laser point data of one key point of the ground marking based on the laser point data of the ground marking in the grid cell.

In the road-surface laser point cloud data, the reflectivity of a laser point cloud of a ground marking and the reflectivity of a laser point cloud of a non-ground marking differ greatly. Generally, a ground region having a ground marking corresponds to a lane line, an arrow, a crosswalk, or the like on the road. Therefore, compared with a laser point cloud of another ground region of a non-ground marking, the reflectivity of a laser point cloud of the ground region is higher. Based on this feature, the laser point data of ground markings may be extracted from the road-surface laser point cloud data.

For example, a quantity of laser points in each grid cell, and an average value and a variance of reflectivity of the laser points may be calculated. Next, the laser point data meeting a preset condition including a quantity threshold and an average value threshold and a variance threshold of reflectivity specified is determined as the laser point data of the ground marking.

For example, a preset condition may be set according to features, learned in advance or obtained through experiences, of the laser points in grid cells including ground markings. The preset condition may specify indicators such as a quantity threshold of laser points in a grid cell that includes a ground marking and an average value threshold and a variance threshold of reflectivity of the laser points. When the laser points in a to-be-processed grid cell meet the specifications of the preset condition, the said laser points are determined as the laser points of the ground marking. For example, if a quantity of laser points in a grid cell and an average value and a variance of reflectivity of the laser points satisfy the specified preset conditions, and the reflectivity of current laser points is greater than the average value by a designated exceeding value, the laser points may be determined as the laser points of the ground marking.

If the road-surface laser point cloud data in one grid cell includes laser point data of a ground marking, laser point data of one key point of the ground marking may be obtained based on the laser point data of the ground marking in the grid cell. For example, when there are a plurality of pieces of laser point data of a ground marking in one grid cell, laser point data of one key point of the ground marking may be obtained based on an average value of the plurality of pieces of laser point data. For example, average values of coordinates (xyz) in the laser point data are calculated, and the obtained average values of the coordinates are then used as the coordinates of the laser point data of the key point of the ground marking.

Based on the embodiment shown in FIG. 4a, in this embodiment, the road object is further determined as a ground marking on the road, and the road-surface laser point cloud data is divided into grid cells according to a preset grid cell size. When it is determined that the road-surface laser point cloud data in one grid cell includes laser point data of a ground marking, the laser point data of one key point of the ground marking is obtained based on the laser point data of the ground marking in the grid cell, thereby conveniently and quickly obtaining the laser point data of key points of the ground markings.

Embodiment 4

Figure 7A:
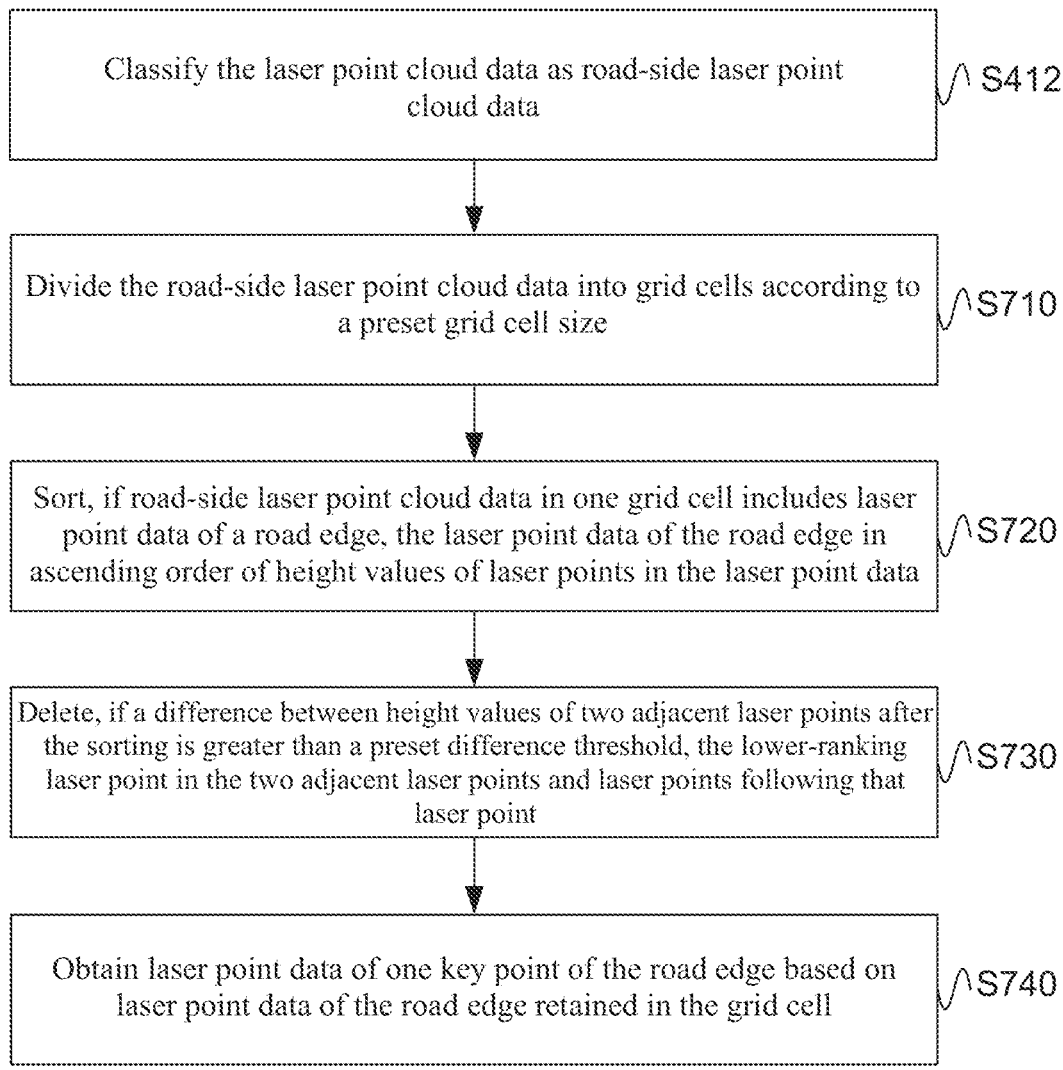
FIG. 7a is flowchart 4 of a method for extracting to-be-matched positioning data, according to an embodiment of this specification.

FIG. 7a is flowchart 4 of a method for extracting to-be-matched positioning data, according to an embodiment of this specification. A difference between this embodiment and the method shown in FIG. 4a lies in that, this embodiment uses an implementation of extracting laser point data of key points of a road object by either side of the road from the road-side laser point cloud data when the road object is a road edge. As shown in FIG. 7a, the following steps in the method may be performed.

S412: Classifying the laser point cloud data as road-side laser point cloud data.

This step may be a specific classification manner of classifying the laser point cloud data in step S410.

S710: Dividing the road-side laser point cloud data into grid cells according to a preset grid cell size.

Preset grid cells may be two-dimensional grid cells set on the horizontal plane, and the entire road-side laser point cloud data may be divided into different grid cells according to projection relationships between the road-side laser point cloud data and the grid cells.

S720: Sorting, if road-side laser point cloud data in one grid cell includes laser point data of a road edge, the laser point data of the road edge in ascending order of height values of laser points in the laser point data.

Laser point data near a region joined to the road in laser point cloud data of the left side of the road is marked as laser point data of a left edge of the road, and laser point data near a region joined to the road in laser point cloud data of the right side of the road is marked as laser point data of a right edge of the road.

In an actual application scenario, laser point data near a region closest to a traveling trajectory of an acquiring vehicle may be separately obtained from the left side of the road and the right side of the road, and used as the laser point data of a road edge.

Figure 7B:
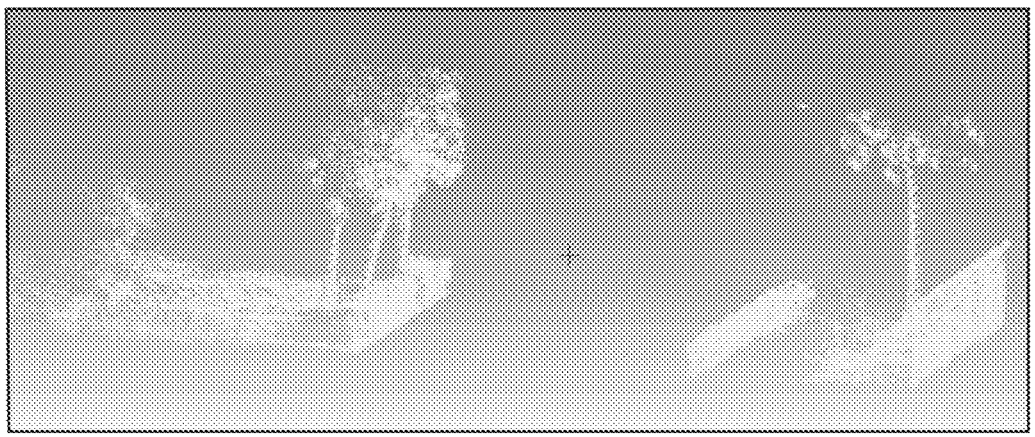
FIG. 7b is an original laser point cloud map of regions on two sides of a road, according to an embodiment of this specification.

As shown in FIG. 7b, for laser point cloud data on both sides of the road, laser point data near boundary points closest to the road may be extracted from regions on both sides and used as laser point data of road edges.

When road-side laser point cloud data in one grid cell includes laser point data of a road edge, the laser point data of the road edge is sorted in ascending order of height values of laser points in the laser point data. During the sorting, laser point data of the left road edge and laser point data of the right road edge may be sorted separately, or the laser point data of the road edges may be sorted together.

S730: Deleting, if a difference between height values of two adjacent laser points after the sorting is greater than a preset difference threshold, the lower-ranking laser point (i.e., the laser point having a larger height value) in the two adjacent laser points and laser points following that laser point.

In an actual application scenario, if a difference between height values of two adjacent laser points after the sorting is greater than a preset difference threshold, it indicates that the two laser points may be located on the boundary between the road and regions on two sides of the road. The lower-ranking laser point in the two laser points and laser points following that laser point may correspond to boundary positions where heights change abruptly such as curbs, guard rails, or green belts on two sides of the road, or suspension points. In this case, the lower-ranking laser point in the two adjacent laser points and laser points following that laser point, that is, laser point data of a road edge far away from the road may be deleted, and the higher-ranking laser point (i.e., the laser point having a smaller height value) in the two adjacent laser points and laser points in front of the laser point, that is, laser point data of a road edge close to the road are retained, to ensure the quality of data to be processed subsequently, and reduce a volume of the data to be processed.

S740: Obtaining laser point data of one key point of the road edge based on laser point data of the road edge retained in the grid cell.

For example, any one piece of laser point data can be selected from laser point data of the road edge retained in the grid cell and used as laser point data of a key point. Alternatively, when there are a plurality of pieces of laser point data of a road edge retained in one grid cell, laser point data of one key point of the road edge may be obtained based on average values of the plurality of pieces of laser point data. For example, average values of coordinates (xyz) in the laser point data are calculated, and the obtained average values of coordinates are then used as coordinates of the laser point data of the key point of the road edge.

Based on the embodiment shown in FIG. 4a, in this embodiment, the road object is further determined as a road edge, and the road-side laser point cloud data is divided into grid cells according to a preset grid cell size. When it is determined that road-side laser point cloud data in one grid cell includes laser point data of a road edge, the laser point data of the road edge is sorted in ascending order of height values in the laser point data. If a difference between height values of two adjacent laser points after the sorting is greater than a preset difference threshold, the lower-ranking laser point in the two adjacent laser points and laser points following the laser point are deleted. Finally, laser point data of one key point of the road edge is obtained based on laser point data of the road edge retained in the grid cell, thereby conveniently and quickly obtaining laser point data of key points of a road edge.

Embodiment 5

Figure 8A:
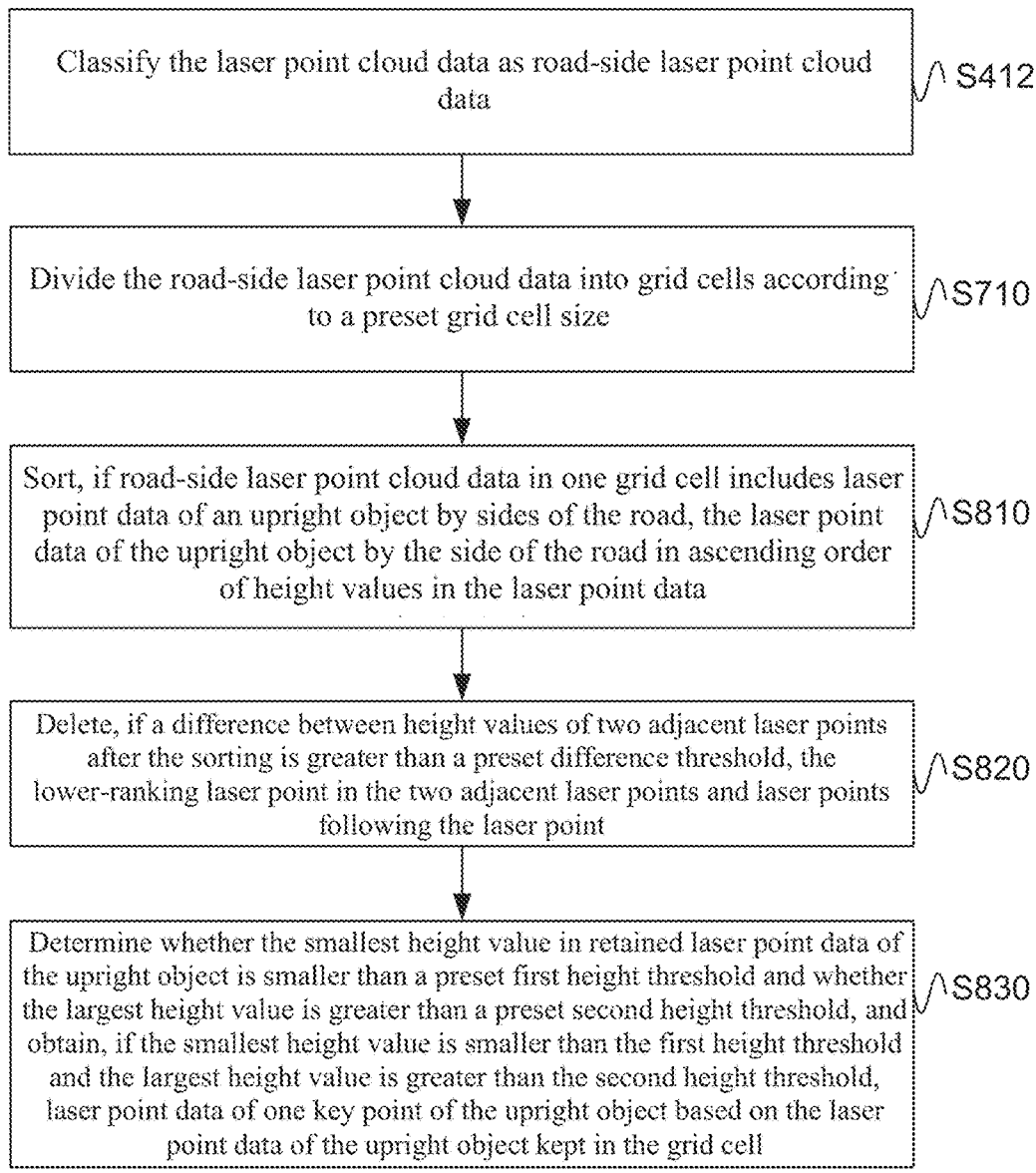
FIG. 8a is flowchart 5 of a method for extracting to-be-matched positioning data, according to an embodiment of this specification.

FIG. 8a is flowchart 5 of a method for extracting to-be-matched positioning data, according to an embodiment of this specification. A difference between this embodiment and the method shown in FIG. 4a lies in that, this embodiment uses an implementation of extracting laser point data of key points of a road object by either side of the road from the road-side laser point cloud data when the road object is an upright object on sides of the road. As shown in FIG. 8a, the following steps in the method may be performed.

S412: Classifying the laser point cloud data as road-side laser point cloud data.

This step may be a specific classification manner of classifying the laser point cloud data in step S410.

S710: Dividing the road-side laser point cloud data into grid cells according to a preset grid cell size.

Preset grid cells may be two-dimensional grid cells set on the horizontal plane, and the entire road-side laser point cloud data may be divided into different grid cells according to projection relationships between the road-side laser point cloud data and the grid cells.

S810: Sorting, if road-side laser point cloud data in one grid cell includes laser point data of an upright object on sides of the road, the laser point data of the upright object by the side of the road in ascending order of height values in the laser point data.

For example, laser point data having heights meeting a preset height range may be extracted from the laser point cloud data on the left side of the road and the right side of the road, and used as laser point data of an upright object on sides of the road.

For example, a height threshold (for example, the height threshold is greater than 0.5 m and smaller than 2.5 m) may be set in advance, to delete laser point cloud data by either side of the road exceeding the height threshold, and the remaining laser point cloud data is selected as laser point data of an upright object on sides of the road.

Figure 8B:
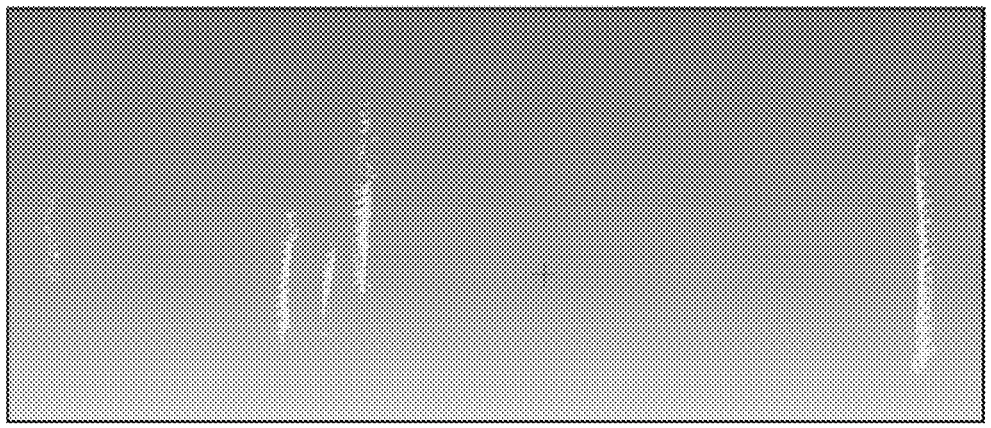
FIG. 8b is a laser point cloud map of upright object points on two sides of a road, according to an embodiment of this specification.

FIG. 8b shows laser point cloud data of upright objects by either side of the road that is extracted from two sides of the road.

When road-side laser point cloud data in one grid cell includes laser point data of an upright object on sides of the road, the laser point data of the upright object by a side of the road is extracted in ascending order of height values in the laser point data. During the sorting, laser point data of an upright object on the left side of the road and laser point data of an upright object on the right side of the road may be sorted separately or may be sorted together.

S820: Deleting, if a height difference between two adjacent laser points after the sorting is greater than a preset difference threshold, the lower-ranking laser point in the two adjacent laser points and laser points following the laser point.

In an actual application scenario, if a difference between height values of two adjacent laser points after the sorting is greater than a preset difference threshold, it indicates that the two laser points may be located on edges of two upright objects in a road-side region. The lower-ranking laser point in the two laser points and laser points following the laser point may correspond to positions where heights change abruptly such as a pole (a support pole of a traffic sign, a street lamp, or a traffic light), a tree trunk, or a wall, or suspension points. In this case, the lower-ranking laser point in the two adjacent laser points and laser points following the laser point may be deleted, and the higher-ranking laser point in the two adjacent laser points and laser points in front of the laser point are retained, to ensure the quality of data to be processed subsequently, and reduce a volume of the data to be processed.

S830: Determining whether the smallest height value in retained laser point data of the upright object is smaller than a preset first height threshold and whether the largest height value is greater than a preset second height threshold, and obtaining, if the smallest height value is smaller than the first height threshold and the largest height value is greater than the second height threshold, laser point data of one key point of the upright object based on the laser point data of the upright object retained in the grid cell.

The first height threshold is smaller than the second height threshold.

In this step, it is further determined whether the upright object corresponding to the retained laser point data of the upright object still meets a specific height range. If the corresponding upright object still meets the specific height range, the laser point data of one key point of the upright object is obtained based on the laser point data of the upright object retained in the grid cell.

For example, any one piece of laser point data may be selected from laser point data of the upright object retained in the grid cell and used as laser point data of a key point. Alternatively, when there are a plurality of pieces of laser point data of the upright object retained in one grid cell, laser point data of one key point of the upright object may be obtained based on average values of the plurality of pieces of laser point data. For example, average values of coordinates (xyz) in the laser point data are calculated, and obtained average values of coordinates are then used as coordinates of the laser point data of the key point of the upright object.

Based on the embodiment shown in FIG. 4a, in this embodiment, the road object is further determined as an upright object by a side of the road, and the road-side laser point cloud data is divided into grid cells according to a preset grid cell size. When it is determined that road-side laser point cloud data in one grid cell includes laser point data of an upright object by a side of the road, the laser point data of the upright object by a side of the road is sorted in ascending order of height values in the laser point data. If a difference between height values of two adjacent laser points after the sorting is greater than a preset difference threshold, the lower-ranking laser point in the two adjacent laser points and laser points following the laser point are deleted. Finally, whether the smallest height value in retained laser point data of the upright object is smaller than a preset first height threshold and whether the largest height value is greater than a preset second height threshold are determined, and if the smallest height value is smaller than the first height threshold and the largest height value is greater than the second height threshold, laser point data of one key point of the upright object is obtained based on the laser point data of the upright object retained in the grid cell, thereby conveniently and quickly obtaining laser point data of key points of upright objects by a side of the road.

Embodiment 6

Figure 9A:
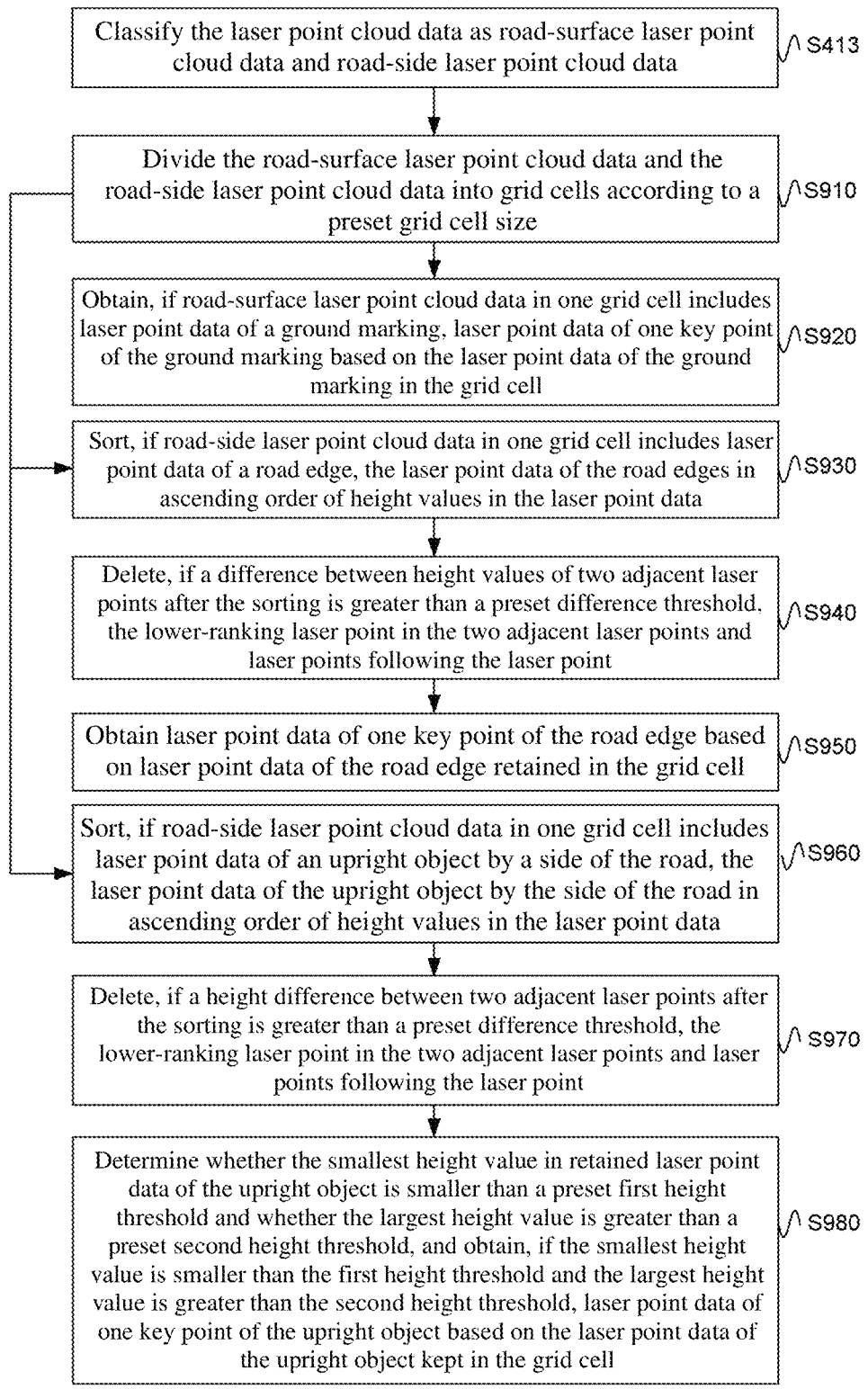
FIG. 9a is flowchart 6 of a method for extracting to-be-matched positioning data, according to an embodiment of this specification.

FIG. 9a is flowchart 6 of a method for extracting to-be-matched positioning data, according to an embodiment of this specification. A difference between this embodiment and the method shown in FIG. 4a lies in that, this embodiment uses an implementation of extracting the laser point data of the key points of the road object on the road and by either side of the road from the road-surface laser point cloud data and the road-side laser point cloud data, when the road object includes a ground marking, a road edge, and an upright object by a side of the road. As shown in FIG. 9a, the following steps in the method may be performed.

S413: Classifying the laser point cloud data as road-surface laser point cloud data and road-side laser point cloud data.

This step may be a specific classification manner of classifying the laser point cloud data in step S410.

S910: Dividing the road-surface laser point cloud data and the road-side laser point cloud data into grid cells according to a preset grid cell size.

S920: Obtaining, if road-surface laser point cloud data in one grid cell includes laser point data of a ground marking, laser point data of one key point of the ground marking based on the laser point data of the ground marking in the grid cell.

S930: Sorting, if road-side laser point cloud data in one grid cell includes laser point data of a road edge, the laser point data of the road edges in ascending order of height values in the laser point data.

S940: Deleting, if a difference between height values of two adjacent laser points after the sorting is greater than a preset difference threshold, the lower-ranking laser point in the two adjacent laser points and laser points following the laser point.

S950: Obtaining laser point data of one key point of the road edge based on laser point data of the road edge retained in the grid cell.

S960: Sorting, if road-side laser point cloud data in one grid cell includes laser point data of an upright object by a side of the road, the laser point data of the upright object by the side of the road in ascending order of height values in the laser point data.

S970: Deleting, if a height difference between two adjacent laser points after the sorting is greater than a preset difference threshold, the lower-ranking laser point in the two adjacent laser points and laser points following the laser point.

S980: Determining whether the smallest height value in retained laser point data of the upright object is smaller than a preset first height threshold and whether the largest height value is greater than a preset second height threshold, and obtaining, if the smallest height value is smaller than the first height threshold and the largest height value is greater than the second height threshold, laser point data of one key point of the upright object based on the laser point data of the upright object kept in the grid cell.

Specific content of step S910 to S960 can be referred to content of similar steps in FIG. 6, FIG. 7a, and FIG. 8a. Details are not described herein.

In an actual application scenario, to reduce suspension points and spurious points in the extracted road-surface laser point cloud data and road-side laser point cloud data, after the laser point cloud data is obtained, the suspension points in the laser point cloud data are first filtered out, so that laser point cloud data after the filtering corresponds to real and valid environmental data. For example, after the road-surface laser point cloud data and the road-side laser point cloud data are divided into grid cells, sorting is performed according to height values of laser points, suspension points in the grid cells are filtered out, and only entity points consecutive from the road surface are retained. Laser point data of suspension objects such as branches other than the trunk of a tree may be effectively filtered out in the process.

Figure 9B:
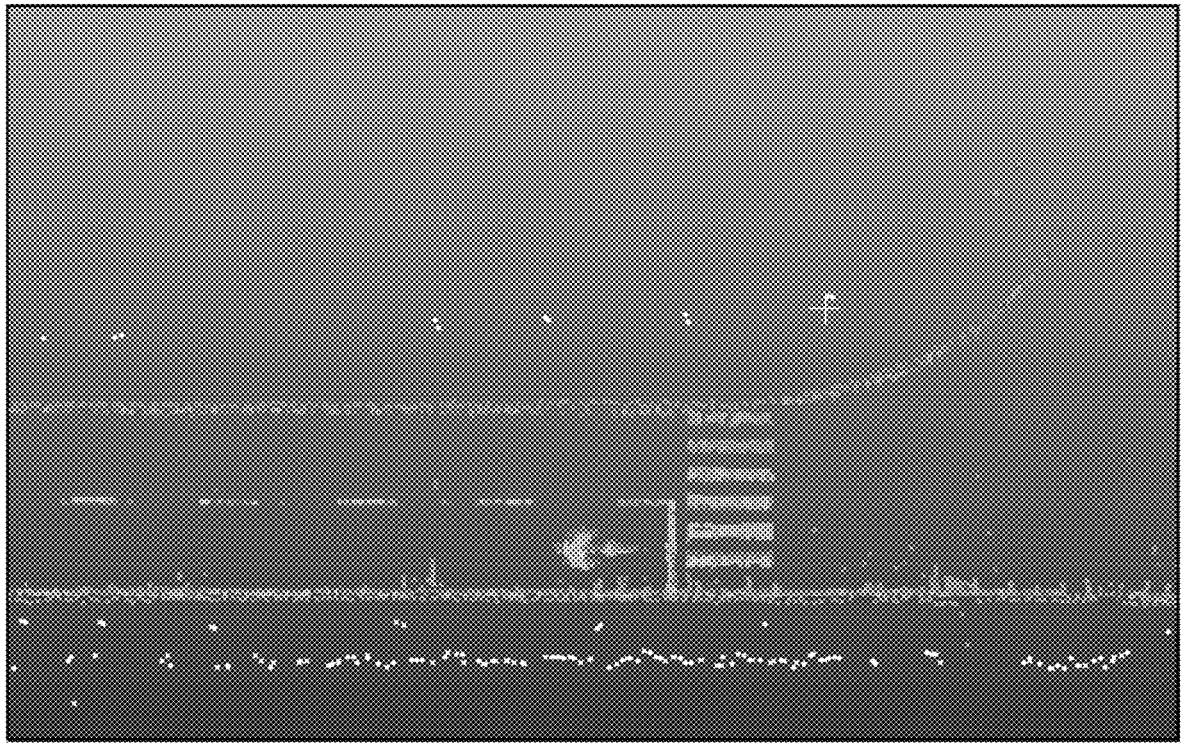
FIG. 9b is a laser point cloud map of ground marking points, edge points on two sides of a road, and upright object points on two sides of the road, according to an embodiment of this specification.

In conclusion, FIG. 9b is a schematic diagram of a laser point cloud of key points of ground markings, road edges, and upright objects by a side of the road that are extracted from laser point cloud data around a road where a vehicle is located.

Based on the embodiment shown in FIG. 4a, in this embodiment, further, a road object is determined as a ground marking on a road, a road edge, or an upright object by a side of the road, and the road-surface laser point cloud data and road-side laser point cloud data are divided into grid cells according to a preset grid cell size; and laser point data of one key point of a corresponding road object may be respectively obtained based on laser point data of the ground marking, laser point data of the road edge, and laser point data of the upright object by a side of the road in the grid cells, thereby conveniently and quickly obtaining laser point data of key points of ground markings, road edges, and upright objects by a side of the road.

Embodiment 7

Figure 10:
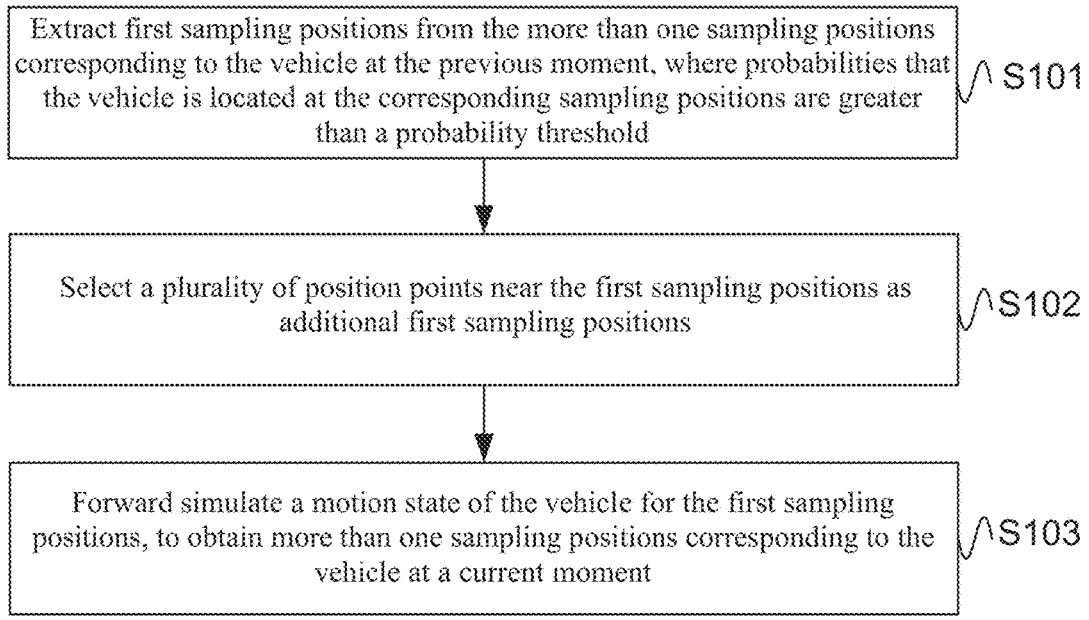
FIG. 10 is flowchart 1 of a method for obtaining a sampling position of a vehicle, according to an embodiment of this specification.

FIG. 10 is flowchart 1 of a method for obtaining a sampling position of a vehicle, according to an embodiment of this specification. This embodiment may be used as an implementation of forward simulating a motion state of the vehicle based on more than one sampling positions corresponding to the vehicle at a previous moment, to obtain more than one sampling positions corresponding to the vehicle at a current moment in the method shown in FIG. 3a. As shown in FIG. 10, the foregoing step S350 may include the following steps.

S101: Extracting first sampling positions from the more than one sampling positions corresponding to the vehicle at the previous moment, where probabilities that the vehicle is located at the corresponding sampling positions are greater than a probability threshold.

For example, sampling positions having probability values greater than a preset probability threshold may be selected based on a result obtained by calculating a probability that the vehicle is located at each sampling position at the previous moment, and used as first sampling positions. Compared with other sampling positions, probabilities that the vehicle appears at the first sampling positions are higher.

S103: Forward simulating a motion state of the vehicle for the first sampling positions, to obtain more than one sampling positions corresponding to the vehicle at a current moment.

Compared with other sampling positions, the sampling positions of the vehicle at the current moment generated by forward simulating the motion of the vehicle based on the first sampling positions are closer to real positions of the vehicle, thereby accurately and quickly performing the high-precision positioning on the vehicle. In addition, in this embodiment, to keep a quantity of sampling positions used at each moment, as shown in FIG. 10, the following steps may further be performed after step S101 and before step S103.

S102: Selecting a plurality of position points near the first sampling positions as additional first sampling positions.

After some sampling positions are selected from the more than one sampling positions of the vehicle used in the previous moment as the first sampling positions to obtain the sampling positions of the vehicle at the current moment, although the accuracy of the sampling positions at the current moment is improved, a quantity of the sampling positions may be reduced. To enable the quantity of the sampling positions of the vehicle at the current moment unchanged or kept at a first level, each time the first sampling positions are extracted, a plurality of position points may be selected near the first sampling positions, and used as additional first sampling positions. Because the additional first sampling positions are located near the original first sampling positions, the accuracy of the sampling positions may still be ensured.

Based on the embodiment shown in FIG. 3a, in this embodiment, first sampling positions are further extracted from the more than one sampling positions corresponding to the vehicle at the previous moment, where probabilities that the vehicle is located at the corresponding sampling positions are greater than a probability threshold. A motion state of the vehicle is forward simulated for the first sampling positions, to obtain more than one sampling positions corresponding to the vehicle at a current moment, thereby conveniently and quickly obtaining a plurality of sampling positions of the vehicle used at the current moment, and ensuring the accuracy of the sampling positions. In addition, a plurality of position points near the first sampling positions are selected as additional first sampling positions, so that a quantity of the first sampling positions may be kept at a particular level, and the accuracy of the sampling positions can also be ensured.

Embodiment 8

Figure 11:
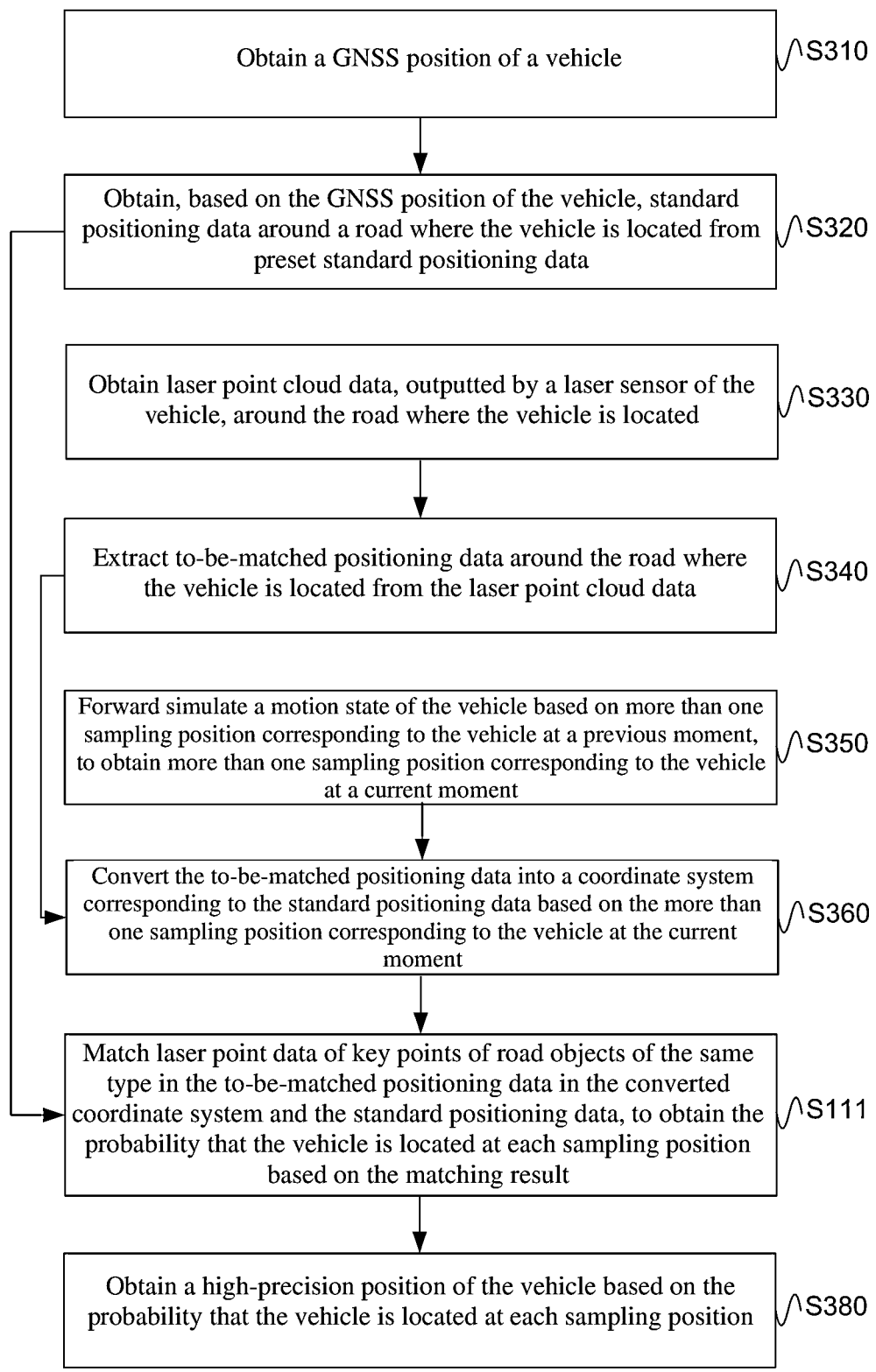
FIG. 11 is flowchart 2 of a positioning method, according to an embodiment of this specification.

FIG. 11 is flowchart 2 of a positioning method, according to an embodiment of this specification. A difference between this embodiment and the positioning method shown in any one of FIG. 3a to FIG. 10 lies in that, this embodiment uses an implementation of matching the to-be-matched positioning data in the converted coordinate system with the standard positioning data, to obtain a probability that the vehicle is located at each sampling position based on a matching result. As shown in FIG. 11, using FIG. 3a as an example, the following steps may be performed after step S360.

S111: Matching laser point data of key points of road objects of the same type in the to-be-matched positioning data in the converted coordinate system and the standard positioning data, to obtain the probability that the vehicle is located at each sampling position based on the matching result.

For example, when the to-be-matched positioning data in the converted coordinate system is matched with the standard positioning data, matching may be performed according to a type classification of laser point data of key points of road objects included in the positioning data. For example, matching is performed respectively on laser point data of key points of road objects which are all ground markings on the road, laser point data of key points of road objects which are all road edges, and laser point data of key points of road objects which are all upright objects on sides of the road, thereby improving the accuracy of a matching result. A probability that the vehicle is located at each sampling position is obtained based on a matching result, so that the accuracy of the probability that the vehicle is located at each sampling position may be improved.

Figure 12:
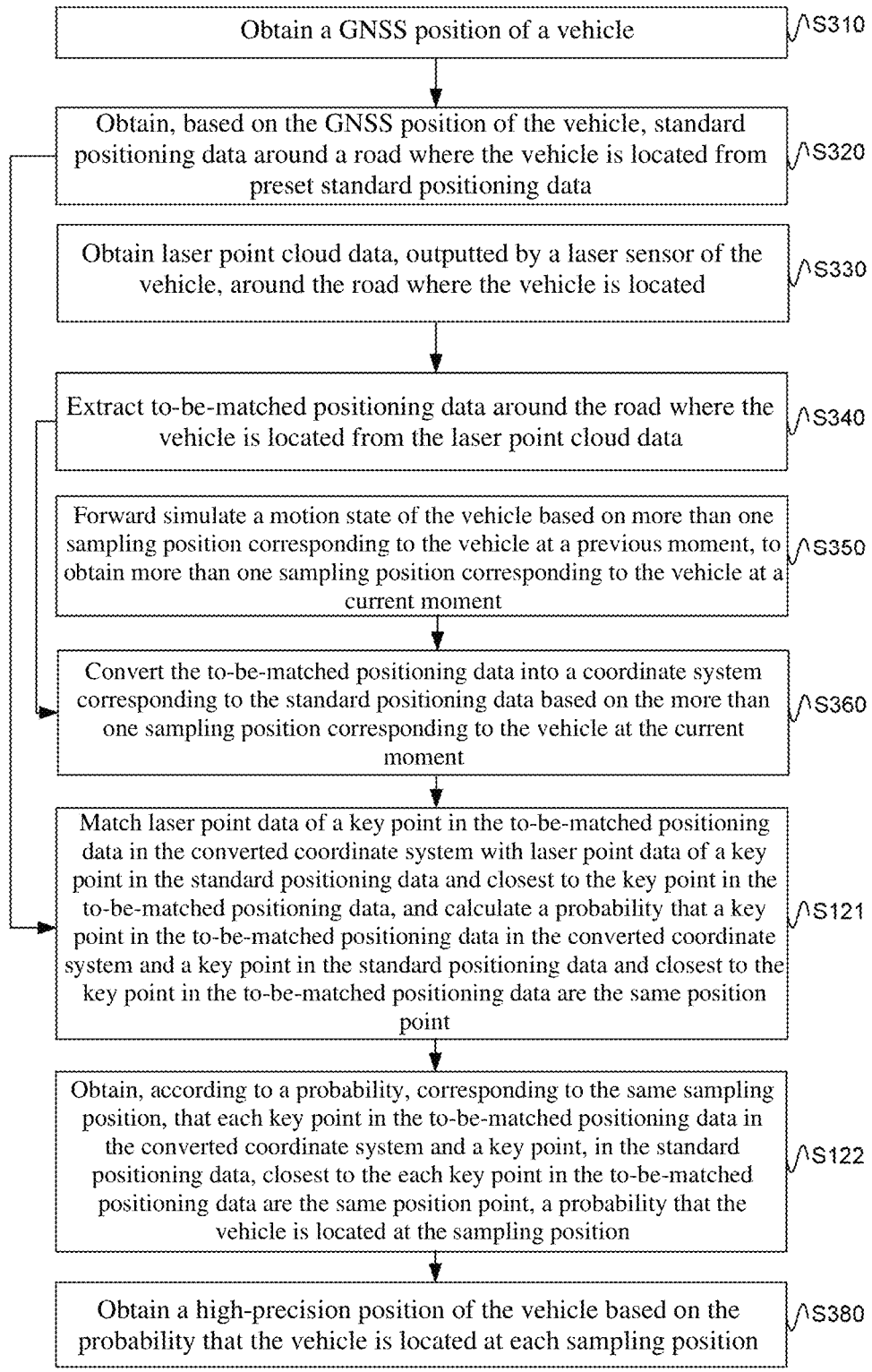
FIG. 12 is flowchart 3 of a positioning method, according to an embodiment of this specification.

Further, FIG. 12 is flowchart 3 of a positioning method, according to an embodiment of this specification. A difference between this embodiment and the positioning method shown in any one of FIG. 3a to FIG. 10 lies in that, this embodiment uses an implementation of matching the to-be-matched positioning data in the converted coordinate system with the standard positioning data, to obtain a probability that the vehicle is located at each sampling position based on a matching result. As shown in FIG. 12, the following steps may be performed after step S360.

S121: Matching laser point data of a key point in the to-be-matched positioning data in the converted coordinate system with laser point data of a key point in the standard positioning data and closest to the key point in the to-be-matched positioning data, and calculating a probability that a key point in the to-be-matched positioning data in the converted coordinate system and a key point in the standard positioning data and closest to the key point in the to-be-matched positioning data are the same position point.

For each sampling position where the vehicle may appear, a probability that the vehicle appears at the sampling position needs to be calculated. The probability may correspond to the probability that the laser point data of a key point in the to-be-matched positioning data in the converted coordinate system and the laser point data of a key point in the standard positioning data and closest to the key point in the to-be-matched positioning data are at the same position point.

For example, for laser point cloud data of each key point in the to-be-matched positioning data in the converted coordinate system, laser point cloud data of a key point, in the standard positioning data, having the smallest spatial distance from the laser point cloud data of the key point is found in the standard positioning data, and a difference between laser point cloud coordinates of the two key points is set to ($\Delta x$, $\Delta y$, $\Delta z$). It is assumed that laser point cloud data of all key points in the standard positioning data conforms to a three-dimensional normal distribution with an average value of $\mu \in \Re^{3 \times 1}$ and a variance of $\Sigma \in \Re^{3 \times 3}$. A distribution probability of laser point cloud data P of each key point in the to-be-matched positioning data relative to laser point cloud data P of a key point in the standard positioning data and closest to the laser point cloud data of the key point in the to-be-matched positioning data is:

$$p(P) = \frac{1}{(2\pi)^{\frac{3}{2}} |\Sigma|^{\frac{1}{2}}} \exp^{-\frac{1}{2}[\Delta x\ \Delta y\ \Delta z]\Sigma^{-1}[\Delta x\ \Delta y\ \Delta z]^T} \quad (2)$$

S122: Obtaining, according to a probability that each key point corresponding to the same sampling position in the to-be-matched positioning data in the converted coordinate system and a key point in the standard positioning data and closest to the each key point in the to-be-matched positioning data are the same position point, a probability that the vehicle is located at the sampling position.

For example, for a sample space in which a quantity of a group of sampling positions of the vehicle is 500, and a quantity of pieces of laser point cloud data of key points in the to-be-matched positioning data is 1000, if for laser point cloud data of key points in the to-be-matched positioning data corresponding to each sampling position, laser point data of key points in the standard positioning data and closest to the laser point cloud data is $\{P_1, P_2, \ldots, P_N\}$, and N is 1000, a probability that the vehicle is located at each sampling position is:

$$p(\{P_1, P_2, \ldots, P_N\}) = \prod_{i=1}^{N} p(P_i) \quad (3)$$

The probability that the vehicle is located at each sampling position may be calculated by using the above process.

Based on the embodiments shown in FIG. 3a to FIG. 10, in this embodiment, laser point data of key points of road objects of the same type in the to-be-matched positioning data in the converted coordinate system and the standard positioning data is matched, to obtain the probability that the vehicle is located at each sampling position based on the matching result, thereby ensuring that comparison is performed between road objects of the same type during the matching of laser point data of key points, so as to improve the accuracy of the matching result, and further improve the accuracy of the probability that the vehicle is located at each sampling position.

In addition, laser point data of a key point in the to-be-matched positioning data in the converted coordinate system is matched with laser point data of a key point in the standard positioning data and closest to the key point in the to-be-matched positioning data, and a probability that a key point in the to-be-matched positioning data in the converted coordinate system and a key point in the standard positioning data and closest to the key point in the to-be-matched positioning data are the same position point is calculated. A probability that the vehicle is located at the sampling position is obtained according to the probability, corresponding to the same sampling position, that each key point in the to-be-matched positioning data in the converted coordinate system and a key point in the standard positioning data and closest to the each key point in the to-be-matched positioning data are the same position point, thereby performing a quantitative calculation on the probability that the vehicle is located at each sampling position and improving the accuracy of a calculation result.

In an actual application scenario, steps in the methods shown in FIG. 11 and FIG. 12 may be combined and completed during a single execution of the positioning method.

In addition, in a conventional positioning method based on laser point clouds, standard positioning data that is used is mainly obtained by using the following method.

Laser point cloud diluting in a three-dimensional space: An original laser point cloud data volume is larger, and the three-dimensional space is divided into several grid cells (having a size of 10*10*10 cm), where each grid cell stores one laser point to reduce a laser point cloud data volume.

Laser point cloud diluting on the ground: A ground is first extracted from an original point cloud, and a ground point cloud is then gridded in a two-dimensional space, where each grid cell only stores statistics information of the reflectivity of the ground point cloud.

Laser point cloud diluting by two sides of the road: A road reference line is first generated, a laser point cloud is then projected onto two sides of the road perpendicular to the reference line, only laser points closest to the reference line are kept, and each grid is stored in a positioning map layer after the laser points are gridded.

However, all the methods have specific deficiencies.

In the first solution, the data volume is excessively large, which is not suitable to storage, matching, and positioning. Some pieces of data (such as shrubs and branches) in the environment change as time, seasons, and climate change, making it difficult to perform effective positioning.

In the second solution, only the reflectivity of ground laser point cloud is kept, and it is difficult to accurately obtain the ground reflectivity when there is water or snow on the ground. Consequently, matching and positioning cannot be performed.

The second solution relies on the reference line, and there are excessive steps of generating maps. Some laser point clouds (such as shrubs and branches) by either side of the road change as time, seasons, and climate change, making it difficult to perform effective positioning. In addition, because this solution only stores data by either side of the road, if there are other vehicles by either side of an autonomous vehicle, a positioning result may be affected.

The process of obtaining standard positioning data used in the positioning method provided in this specification remedies the deficiencies in the conventional methods. An easily recognizable road object with a stable attribute on the road and/or by either side of the road is used as a road object, and laser point data of key points of the road object is extracted as positioning data of the road. Such a road object generally does not change as an environment changes or as time goes by. Positioning is matching environmental information obtained in real time when a vehicle travels with positioning data, so as to determine a position of the vehicle. Therefore, laser point data of key points of an easily recognizable road object with a stable attribute on a road and/or by either side of a road is extracted as positioning data, so that a positioning success rate can be ensured. In addition, in this specification, only the laser point data of the key points is extracted. Therefore, a data volume is smaller, facilitating storage and transmission of the data, and a calculation amount may also be reduced when high-precision positioning is performed on the vehicle subsequently, thereby improving the positioning efficiency.

Embodiment 9

Figure 13:
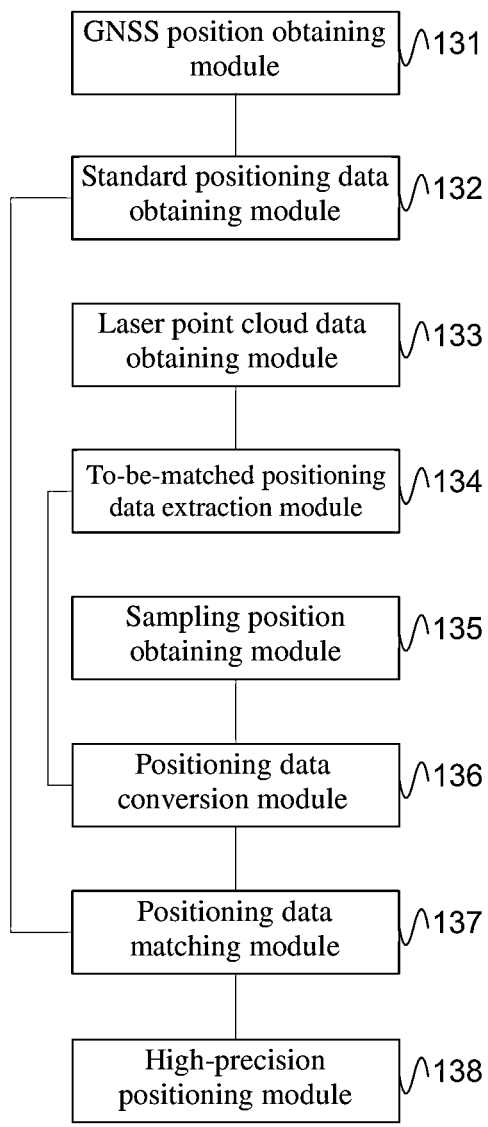
FIG. 13 is structural diagram 1 of a positioning apparatus, according to an embodiment of this specification.

FIG. 13 is a structural diagram 1 of a positioning apparatus, according to an embodiment of this specification. The positioning apparatus may be disposed in the positioning system shown in FIG. 2, and is configured to perform steps in the method shown in FIG. 3a. The apparatus includes:
- a GNSS position obtaining module 131, configured to obtain a GNSS position of a vehicle;
- a standard positioning data obtaining module 132, configured to obtain, based on the GNSS position of the vehicle, standard positioning data around a road where the vehicle is located from preset standard positioning data, where the standard positioning data includes laser point data of key points of an easily recognizable road object with a stable attribute on the road and/or by either side of the road;
- a laser point cloud data obtaining module 133, configured to obtain laser point cloud data, outputted by a laser sensor of the vehicle, around the road where the vehicle is located;
- a to-be-matched positioning data extraction module 134, configured to extract to-be-matched positioning data around the road where the vehicle is located from the laser point cloud data, where the to-be-matched positioning data includes laser point data of key points of an easily recognizable road object with a stable attribute on the road and/or by either side of the road where the vehicle is located;
- a sampling position obtaining module 135, configured to forward simulate a motion state of the vehicle based on more than one sampling positions corresponding to the vehicle at a previous moment, to obtain more than one sampling positions corresponding to the vehicle at a current moment;
- a positioning data conversion module 136, configured to convert the to-be-matched positioning data into a coordinate system corresponding to the standard positioning data based on the more than one sampling positions corresponding to the vehicle at the current moment;
- a positioning data matching module 137, configured to match the to-be-matched positioning data in the converted coordinate system with the standard positioning data, to obtain a probability that the vehicle is located at each sampling position at the current moment based on a matching result; and
- a high-precision positioning module 138, configured to obtain a high-precision position of the vehicle based on the probability that the vehicle is located at each sampling position at the current moment.

Figure 14:
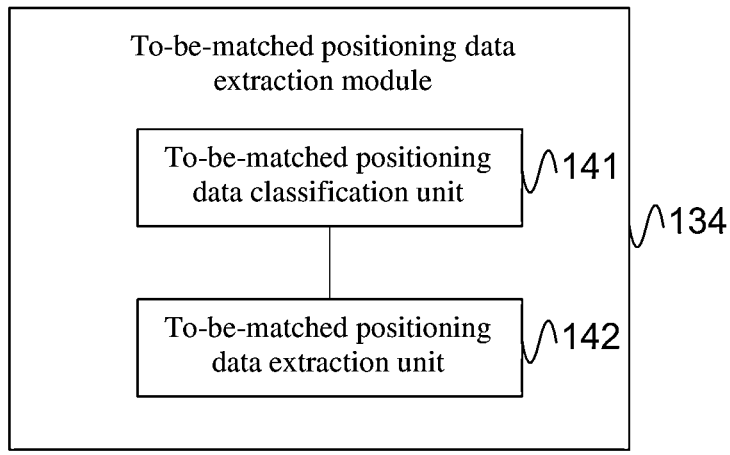
FIG. 14 is structural diagram 1 of a to-be-matched positioning data extraction module, according to an embodiment of this specification.

Further, as shown in FIG. 14, in the positioning apparatus, the to-be-matched positioning data extraction module 134 may include:

a to-be-matched positioning data classification unit 141, configured to classify the laser point cloud data as road-surface laser point cloud data and/or road-side laser point cloud data; and a to-be-matched positioning data extraction unit 142, configured to extract the laser point data of the key points of the road object on the road from the road-surface laser point cloud data and/or the key points by either side of the road from the road-side laser point cloud data.

The to-be-matched positioning data extraction module shown in FIG. 14 may be configured to perform steps in the method shown in FIG. 4*a*.

Figure 15:
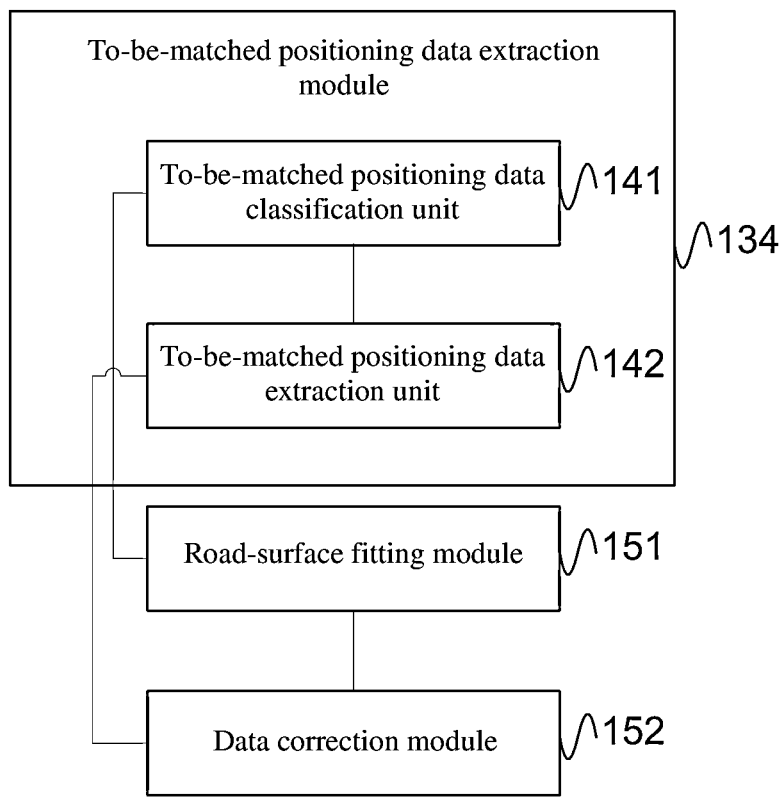
FIG. 15 is an extended structural diagram of a to-be-matched positioning data extraction module, according to an embodiment of this specification.

Further, as shown in FIG. 15, based on the structure shown in FIG. 14, the positioning apparatus may further include:

a road-surface fitting module 151, configured to fit a road surface of the road according to the road-surface laser point cloud data; and a data adjustment module 152, configured to adjust, based on the fitted road surface, height values of the road-surface laser point cloud data and/or the road-side laser point cloud data to height values relative to the road surface.

The apparatus structure shown in FIG. 15 may be configured to perform steps in the method shown in FIG. 5.

Figure 16:
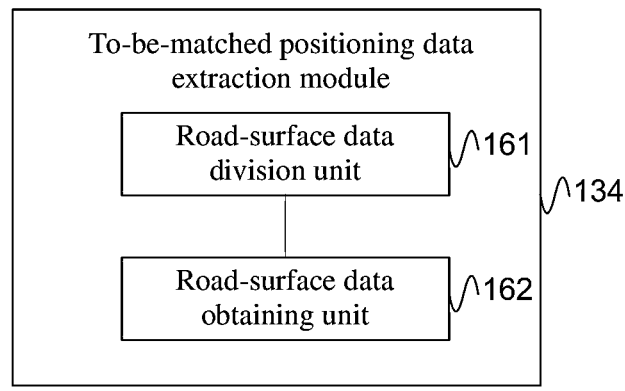
FIG. 16 is structural diagram 2 of a to-be-matched positioning data extraction module, according to an embodiment of this specification.

Further, as shown in FIG. 16, based on the structure shown in FIG. 14 or FIG. 15, the road object may be a ground marking on the road, and the to-be-matched positioning data extraction module 134 may include:

a road-surface data division unit 161, configured to divide the road-surface laser point cloud data into grid cells according to a preset grid cell size; and a road-surface data obtaining unit 162, configured to obtain, if road-surface laser point cloud data in one grid cell includes laser point data of a ground marking, laser point data of one key point of the ground marking based on the laser point data of the ground marking in the grid cell.

The to-be-matched positioning data extraction module shown in FIG. 16 may be configured to perform steps in the method shown in FIG. 6.

Figure 17:
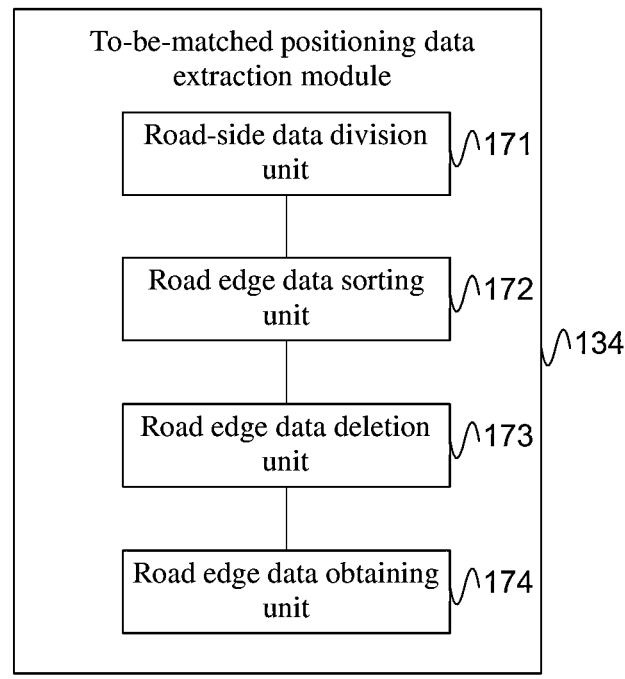
FIG. 17 is structural diagram 3 of a to-be-matched positioning data extraction module, according to an embodiment of this specification.

Further, as shown in FIG. 17, based on the structure shown in FIG. 14 or FIG. 15, the road object may be a road edge, and the to-be-matched positioning data extraction module 134 may include:

a road-side data division unit 171, configured to divide the road-side laser point cloud data into grid cells according to a preset grid cell size;

a road edge data sorting unit 172, configured to sort, if road-side laser point cloud data in one grid cell includes laser point data of a road edge, the laser point data of the road edges in ascending order of height values in the laser point data;

a road edge data deletion unit 173, configured to delete, if a difference between height values of two adjacent laser points after the sorting is greater than a preset difference threshold, the lower-ranking laser point in the two adjacent laser points and laser points following the laser point; and a road edge data obtaining unit 174, configured to obtain laser point data of one key point of the road edge based on laser point data of the road edge kept in the grid cell.

The to-be-matched positioning data extraction module shown in FIG. 17 may be configured to perform steps in the method shown in FIG. 7*a*.

Figure 18:
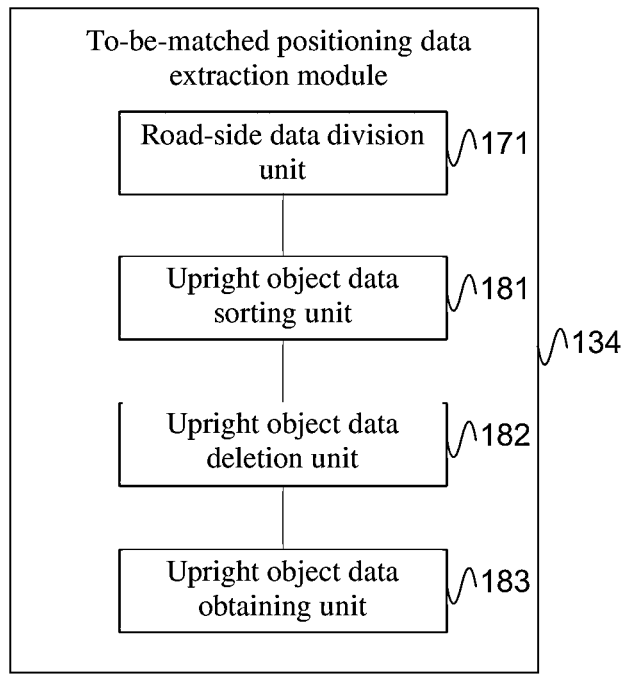
FIG. 18 is structural diagram 4 of a to-be-matched positioning data extraction module, according to an embodiment of this specification.

Further, as shown in FIG. 18, based on the structure shown in FIG. 14 or FIG. 15, the road object may be an upright object by a side of the road, and the to-be-matched positioning data extraction module 134 may include:

a road-side data division unit 171, configured to divide the road-side laser point cloud data into grid cells according to a preset grid cell size;

an upright object data sorting unit 181, configured to sort, if road-side laser point cloud data in one grid cell includes laser point data of an upright object by a side of the road, the laser point data of the upright object by the side of the road in ascending order of height values in the laser point data;

an upright object data deletion unit 182, configured to delete, if a height difference between two adjacent laser points after the sorting is greater than a preset difference threshold, the lower-ranking laser point in the two adjacent laser points and laser points following the laser point; and an upright object data obtaining unit 183, configured to determine whether the smallest height value in kept laser point data of the upright object is smaller than a preset first height threshold and whether the largest height value is greater than a preset second height threshold, and obtain, if the smallest height value is smaller than the first height threshold and the largest height value is greater than the second height threshold, laser point data of one key point of the upright object based on the laser point data of the upright object kept in the grid cell.

The to-be-matched positioning data extraction module shown in FIG. 18 may be configured to perform steps in the method shown in FIG. 8*a*.

Figure 19:
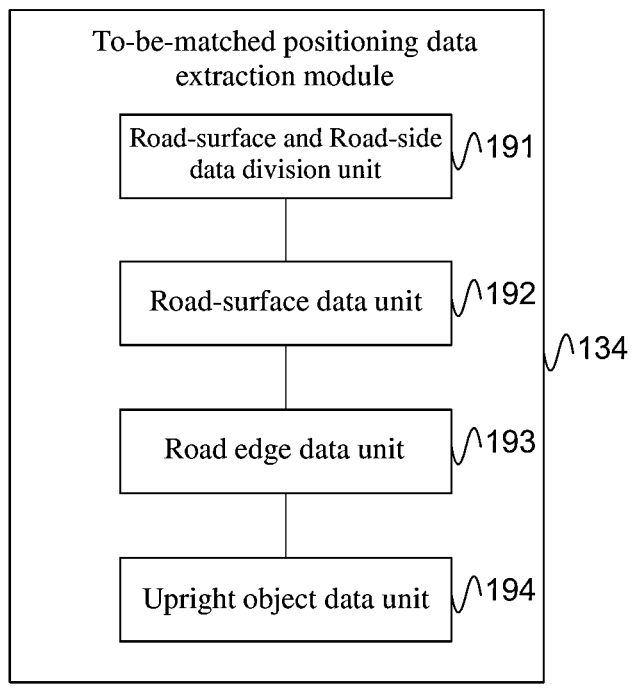
FIG. 19 is structural diagram 5 of a to-be-matched positioning data extraction module, according to an embodiment of this specification.

Further, as shown in FIG. 19, based on the structure shown in FIG. 14 or FIG. 15, the road object may include a ground marking, a road edge, and an upright object by a side of the road, and the to-be-matched positioning data extraction module 134 may include:

a road-surface and road-side data division unit 191, configured to divide the road-surface laser point cloud data and the road-side laser point cloud data into grid cells according to a preset grid cell size;

a road-surface data unit 192, configured to obtain, if road-surface laser point cloud data in one grid cell includes laser point data of a ground marking, laser point data of one key point of the ground marking based on the laser point data of the ground marking in the grid cell;

a road edge data unit 193, configured to sort, if road-side laser point cloud data in one grid cell includes laser point data of a road edge, the laser point data of the road edges in ascending order of height value in the laser point data, delete, if a difference between height values of two adjacent laser points after the sorting is greater than a preset difference threshold, the lower-ranking laser point in the two adjacent laser points and laser points following the laser point, and obtain laser point data of one key point of the road edge based on laser point data of the road edge kept in the grid cell; and an upright object data unit 194, configured to: sort, if road-side laser point cloud data in one grid cell includes laser point data of an upright object by a side of the road, the laser point data of the upright object by the side of the road in ascending order of height value in the laser point data, delete, if a height difference between two adjacent laser points after the sorting is greater than a preset difference threshold, the lower-ranking laser point in the two adjacent laser points and laser points following the laser point, and determine whether the smallest height value in kept laser point data of the upright object is smaller than a preset first height threshold and whether the largest height value is greater than a preset second height threshold, and obtain, if the smallest height value is smaller than the first height threshold and the largest height value is greater than the second height threshold, laser point data of one key point of the upright object based on the laser point data of the upright object kept in the grid cell.

The to-be-matched positioning data extraction module shown in FIG. 19 may be configured to perform steps in the method shown in FIG. 9a.

Further, sampling positions of the vehicle at an initial moment may be more than one position points selected from a positioning region where a GNSS position of the vehicle is located at the initial moment.

Figure 20:
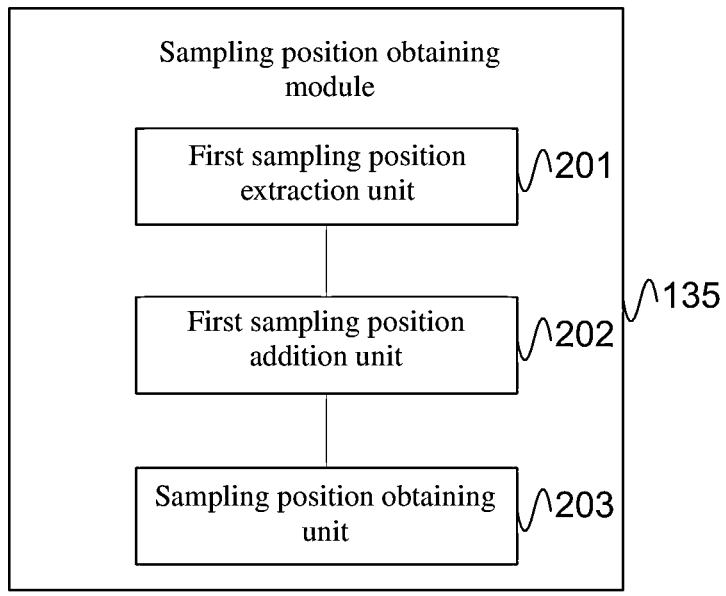
FIG. 20 is a structural diagram of a sampling position obtaining module, according to an embodiment of this specification.

Further, as shown in FIG. 20, in the positioning apparatus, the sampling position obtaining module 135 may include:
  a first sampling position extraction unit 201, configured to extract first sampling positions from the more than one sampling positions corresponding to the vehicle at the previous moment, where probabilities that the vehicle is located at the corresponding sampling positions are greater than a probability threshold; and
  a sampling position obtaining unit 203, configured to forward simulate a motion state of the vehicle for the first sampling positions, to obtain more than one sampling positions corresponding to the vehicle at a current moment.

Further, the sampling position obtaining module shown in FIG. 20 may further include:
  a first sampling position addition unit 202, configured to select a plurality of position points near the first sampling positions as additional first sampling positions.

The sampling position obtaining module shown in FIG. 20 may be configured to perform steps in the method shown in FIG. 10.

Further, in the positioning apparatus shown in any figure, the positioning data matching module 137 may be configured to:
  match laser point data of key points of road objects of the same type in the to-be-matched positioning data in the converted coordinate system and the standard positioning data, to obtain the probability that the vehicle is located at each sampling position based on the matching result.

Figure 21:
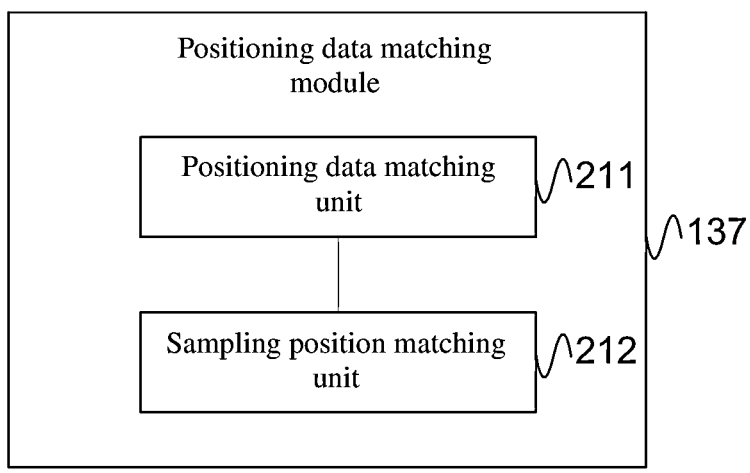
FIG. 21 is a structural diagram of a positioning data matching module, according to an embodiment of this specification.

Further, as shown in FIG. 21, the positioning data matching module 137 may include:
  a positioning data matching unit 211, configured to: match laser point data of a key point in the to-be-matched positioning data in the converted coordinate system with laser point data of a key point in the standard positioning data and closest to the key point in the to-be-matched positioning data, and calculate a probability that a key point in the to-be-matched positioning data in the converted coordinate system and a key point in the standard positioning data and closest to the key point in the to-be-matched positioning data are the same position point; and
  a sampling position matching unit 212, configured to obtain, according to a probability, corresponding to the same sampling position, that each key point in the to-be-matched positioning data in the converted coordinate system and a key point in the standard positioning data and closest to the each key point in the to-be-matched positioning data are the same position point, a probability that the vehicle is located at the sampling positions.

The positioning data matching module shown in FIG. 21 may be configured to perform step S111 in the method shown in FIG. 11 and FIG. 12 and the content of S121 and S122.

Further, the high-precision positioning module 138 may be configured to:
  determine a sampling position with the highest probability in the probabilities that the vehicle is located at sampling positions as the high-precision position of the vehicle,
  or
  perform weighting calculation on corresponding sampling positions by using the probability that the vehicle is located at each sampling position as a weight, and obtain a weighted position as the high-precision position of the vehicle.

This specification provides a positioning apparatus. Standard positioning data around a road where a vehicle is located is obtained based on an obtained GNSS position of the vehicle from preset standard positioning data. Laser point cloud data, outputted by a laser sensor of the vehicle and around the road where the vehicle is located, is obtained. To-be-matched positioning data around the road where the vehicle is located is extracted from the laser point cloud data, where both the standard positioning data and the to-be-matched positioning data include laser point data of key points of an easily recognizable road object with a stable attribute on the road and/or by either side of the road where the vehicle is located. A motion state of the vehicle is forward simulated based on more than one sampling positions corresponding to the vehicle at a previous moment, to obtain more than one sampling positions corresponding to the vehicle at a current moment. The to-be-matched positioning data is converted into a coordinate system corresponding to the standard positioning data based on the more than one sampling positions corresponding to the vehicle at the current moment, and the to-be-matched positioning data in the converted coordinate system is matched with the standard positioning data, to obtain a probability that the vehicle is located at each sampling position based on a matching result. A high-precision position of the vehicle is obtained based on the probability that the vehicle is located at each sampling position. The road object in this specification is an easily recognizable road object with a stable attribute on the road and/or by either side of the road, and such a road object generally does not change as an environment changes or as time goes by. Therefore, by using extracted laser point data of key points of the easily recognizable road object with a stable attribute on the road and/or by either side of the road as matching objects of high-precision positioning, a positioning success rate and the positioning accuracy can be ensured. In addition, in this specification, only the laser point data of the key points of the road object is extracted for matching. Therefore, a data volume is smaller, thereby greatly reducing a calculation amount and improving the positioning efficiency.

Further, the laser point cloud data is classified as road-surface laser point cloud data and/or road-side laser point cloud data. Next, the laser point data of the key points of the road object on the road is extracted from the road-surface laser point cloud data and/or the road object by either side of the road is extracted from the road-side laser point cloud data, thereby conveniently and quickly obtaining the laser point data of the key points of the road object, that is, the to-be-matched positioning data.

In addition, before the laser point data of the key points of the road object on the road and/or by either side of the road is extracted, a road surface of the road is fitted by using the road-surface laser point cloud data. Height values of the road-surface laser point cloud data and the road-side laser point cloud data are adjusted to height values relative to the road surface based on the fitted road surface, thereby ensuring the accuracy of height positions of the laser point cloud data.

Further, the road object is determined as a ground marking on the road, and the road-surface laser point cloud data is divided into grid cells according to a preset grid cell size. When it is determined that road-surface laser point cloud data in one grid cell includes laser point data of a ground marking, laser point data of one key point of the ground marking is obtained based on the laser point data of the ground marking in the grid cell, thereby conveniently and quickly obtaining laser point data of key points of ground markings.

Further, the road object is determined as a road edge, and the road-side laser point cloud data is divided into grid cells according to a preset grid cell size. When it is determined that road-side laser point cloud data in one grid cell includes laser point data of a road edge, the laser point data of the road edge is sorted in ascending order of height values in the laser point data. If a difference between height values of two adjacent laser points after the sorting is greater than a preset difference threshold, the lower-ranking laser point in the two adjacent laser points and laser points following the laser point are deleted. Finally, laser point data of one key point of the road edge is obtained based on laser point data of the road edge kept in the grid cell, thereby conveniently and quickly obtaining laser point data of key points of a road edge.

Further, the road object is determined as an upright object by a side of the road, and the road-side laser point cloud data is divided into grid cells according to a preset grid cell size. When it is determined that road-side laser point cloud data in one grid cell includes laser point data of an upright object by a side of the road, the laser point data of the upright object by a side of the road is sorted in ascending order of height values in the laser point data. If a difference between height values of two adjacent laser points after the sorting is greater than a preset difference threshold, the lower-ranking laser point in the two adjacent laser points and laser points following the laser point are deleted. Finally, whether the smallest height value in kept laser point data of the upright object is smaller than a preset first height threshold and whether the largest height value is greater than a preset second height threshold are determined, and if the smallest height value is smaller than the first height threshold and the largest height value is greater than the second height threshold, laser point data of one key point of the upright object is obtained based on the laser point data of the upright object kept in the grid cell, thereby conveniently and quickly obtaining laser point data of key points of upright objects by a side of the road.

Further, a road object is determined as a ground marking on a road, a road edge, or an upright object by a side of the road, and the road-surface laser point cloud data and road-side laser point cloud data are divided into grid cells according to a preset grid cell size. Laser point data of one key point of a corresponding road object may be respectively obtained based on laser point data of the ground marking, laser point data of the road edge, and laser point data of the upright object by a side of the road in the grid cells, thereby conveniently and quickly obtaining laser point data of key points of ground markings, road edges, and upright objects by a side of the road.

Further, first sampling positions are extracted from the more than one sampling positions corresponding to the vehicle at the previous moment, where probabilities that the vehicle is located at the corresponding sampling positions are greater than a probability threshold. A motion state of the vehicle is forward simulated for the first sampling positions, to obtain more than one sampling positions corresponding to the vehicle at a current moment, thereby conveniently and quickly obtaining a plurality of sampling positions of the vehicle used at the current moment, and ensuring the accuracy of the sampling positions. In addition, a plurality of position points near the first sampling positions are selected as additional first sampling positions, so that a quantity of the first sampling positions may be kept at a particular level, and the accuracy of the sampling positions can also be ensured.

Further, laser point data of key points of road objects of the same type in the to-be-matched positioning data in the converted coordinate system and the standard positioning data is matched, to obtain the probability that the vehicle is located at each sampling position based on the matching result, thereby ensuring that comparison is performed between road objects of the same type during the matching of laser point data of key points, so as to improve the accuracy of the matching result, and further improve the accuracy of the probability that the vehicle is located at each sampling position.

In addition, laser point data of a key point in the to-be-matched positioning data in the converted coordinate system is matched with laser point data of a key point in the standard positioning data and closest to the key point in the to-be-matched positioning data. A probability that a key point in the to-be-matched positioning data in the converted coordinate system and a key point in the standard positioning data and closest to the key point in the to-be-matched positioning data are the same position point is calculated. A probability that the vehicle is located at the sampling position is obtained according to a probability, corresponding to the same sampling position, that each key point in the to-be-matched positioning data in the converted coordinate system and a key point in the standard positioning data and closest to the each key point in the to-be-matched positioning data are the same position point, thereby performing a quantitative calculation on the probability that the vehicle is located at each sampling position, and improving the accuracy of a calculation result.

Embodiment 10

Figure 22:
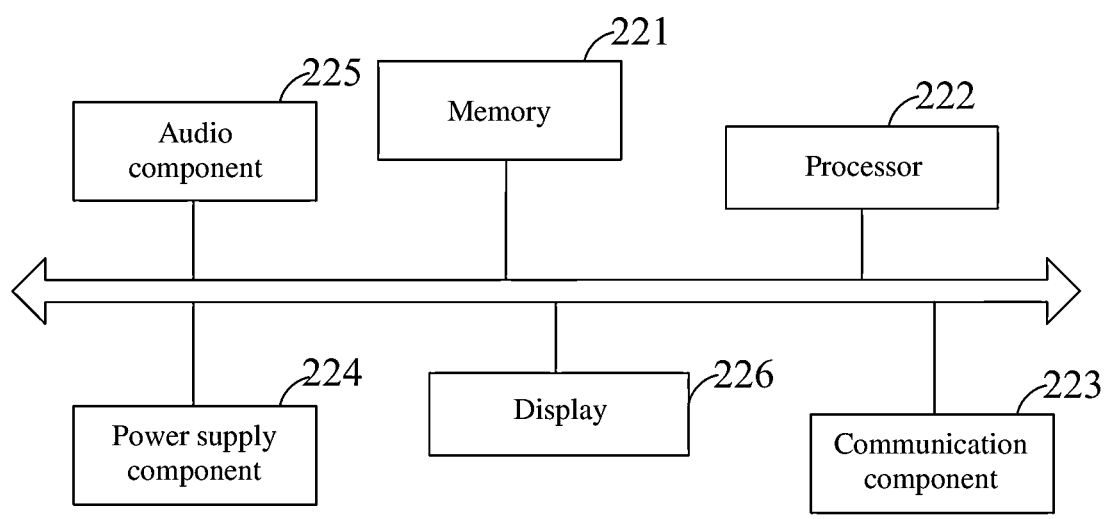
FIG. 22 is a schematic structural diagram of an electronic device, according to an embodiment of this specification.

An overall architecture of the positioning apparatus is described above. The function of the apparatus can be implemented by using an electronic device. FIG. 22 is a schematic structural diagram of an electronic device, according to an embodiment of this specification. The electronic device includes a memory 221 and a processor 222.

The memory 221 is configured to store a program.

In addition to the programs, the memory 221 may further be configured to store other data to support operations on the electronic device. Examples of the data include instructions of any application program or method for operations on the electronic device, such as contact data, address book data, a message, a picture, and a video.

The memory 221 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The processor 222 is coupled to the memory 221 and configured to execute the program in the memory 221. The program, when run, execute any positioning method in FIG. 3a to FIG. 12.

The foregoing processing operations have been described in detail in the previous embodiments, and will not be repeated herein.

Further, as shown in FIG. 22, the electronic device may further include: a communication component 223, a power supply component 224, an audio component 225, a display 226, and other components. Only some components are schematically shown in FIG. 22, which does not mean that the electronic device includes only the components shown in FIG. 22.

The communication component 223 is configured to facilitate communication between the electronic device and other devices in a wired or wireless manner. The electronic device may access a communication standard-based wireless network, such as Wi-Fi, 2G, 3G, or a combination thereof. In an example embodiment, the communication component 223 receives a broadcast signal or broadcast related information from an external broadcast management system via a broadcast channel. In an example embodiment, the communication component 223 further includes a near field communication (NFC) module, to promote short-range communication. For example, the NFC module may be implemented based on a radio frequency identification (RFID) technology, an infra-red data association (IrDA) technology, an ultra-wideband (UWB) technology, a Bluetooth (BT) technology, and other technologies.

The power supply component 224 provides power for components of the electronic device. The power supply component 224 may include a power supply management system, one or more power supplies, and other components related to generation, management, and allocation of power for the electronic device.

The audio component 225 is configured to output and/or input an audio signal. For example, the audio component 225 includes a microphone (MIC). When the electronic device is in the operating mode, such as a call mode, a record mode, and a speech recognition mode, the microphone is configured to receive an external audio signal. The received audio signal may further be stored in the memory 221 or sent through the communication component 223. In some embodiments, the audio component 225 further includes a speaker, configured to output an audio signal.

The display 226 includes a screen, which may include a liquid crystal display (LCD) and a touch panel (TP). If the screen includes a TP, the screen may be implemented as a touchscreen to receive an input signal from the user. The touch panel includes one or more touch sensors to sense a touch, a slide, and a gesture on the touch panel. The touch sensor may not only sense the boundary of touching or sliding operations, but also detect duration and pressure related to the touching or sliding operations.

A person of ordinary skill in the art may understand that all or some of the steps of the method embodiments may be implemented by a program instructing relevant hardware. The foregoing program may be stored in a computer-readable storage medium. When the program is executed, steps of the method embodiments are performed. The foregoing storage medium includes: a medium such as a ROM, a RAM, a magnetic disk, or an optical disc that can store program code.

Finally, the foregoing embodiments are merely used for describing the technical solutions of this specification, but are not intended to limit this specification. Although this specification is described in detail with reference to the foregoing embodiments, a person of ordinary skill in the art should understand that, modifications may still be made to the technical solutions in the foregoing embodiments, or equivalent replacements may be made to some or all of the technical features; and these modifications or replacements will not cause the essence of corresponding technical solutions to depart from the scope of the technical solutions in the embodiments of this specification.

What is claimed is:

1. A positioning method, comprising:
obtaining a Global Navigation Satellite System (GNSS) position of a vehicle;
obtaining, based on the GNSS position of the vehicle, standard positioning data around a road where the vehicle is located from preset standard positioning database, wherein the standard positioning data comprises pre-computed and pre-stored laser point data of GNSS-positioned key points of road objects with stable attributes on or by either side of the road;
obtaining laser point cloud data, outputted by a laser sensor of the vehicle, around the road where the vehicle is located;
extracting to-be-matched positioning data around the road where the vehicle is located from the laser point cloud data, wherein the to-be-matched positioning data comprises laser point data of laser-sensor-output key points of at least one road object with a stable attribute on or by either side of the road where the vehicle is located;
obtaining more than one sampling positions corresponding to the vehicle at a previous moment;
combining the more than one sampling positions with a plurality of position points near the more than one sampling positions to form first sampling positions;
forward simulating a motion state of the vehicle based on the first sampling positions, to obtain more than one simulated positions corresponding to the vehicle at a current moment;
converting the to-be-matched positioning data into a coordinate system corresponding to the standard positioning data based on the more than one simulated positions corresponding to the vehicle at the current moment;
matching the to-be-matched positioning data in the coordinate system with the standard positioning data, to obtain a probability that the vehicle is located at each simulated position corresponding to the vehicle at the current moment based on a matching result; and
obtaining a position of the vehicle based on the probability that the vehicle is located at each simulated position corresponding to the vehicle at the current moment.

2. The method according to claim 1, wherein the extracting to-be-matched positioning data around the road where the vehicle is located from the laser point cloud data comprises:
classifying the laser point cloud data as road-surface laser point cloud data and/or road-side laser point cloud data; and extracting laser point data of laser-sensor-output key points of at least one road object on the road from the road-surface laser point cloud data or at least one road object by either side of the road from the road-side laser point cloud data.

3. The method according to claim 2, wherein before the extracting the laser point data of the key points of the at least one road object, the method further comprises:
fitting a road surface of the road according to the road-surface laser point cloud data; and
adjusting, based on the fitted road surface, height values of laser points in the road-surface laser point cloud data and/or the road-side laser point cloud data to height values relative to the fitted road surface.

4. The method according to claim 2, wherein the at least one road object comprises a ground marking on the road and the extracting the laser point data of the key points of the at least one road object on the road from the road-surface laser point cloud data comprises:
dividing the road-surface laser point cloud data into a plurality of grid cells according to a preset grid cell size; and
when one of the plurality of grid cells comprises laser point data of the ground marking, obtaining laser point data of a key point of the ground marking based on the laser point data of the ground marking in the grid cell.

5. The method according to claim 2, wherein the at least one road object comprises a road edge and the extracting the laser point data of the key points of the at least one road object by either side of the road from the road-side laser point cloud data comprises:
dividing the road-side laser point cloud data into a plurality of grid cells according to a preset grid cell size;
when one of the plurality of grid cells comprises laser point data of the road edge, sorting the laser point data of the road edge in ascending order of height values of laser points in the laser point data in the grid cell;
when a difference between height values of two adjacent laser points in the grid cell after the sorting is greater than a difference threshold, updating the laser point data in the grid cell by deleting a laser point having a larger height value in the two adjacent laser points and one or more laser points following the laser point having the larger height value from the laser point data in the grid cell; and
obtaining laser point data of a key point of the road edge based on the updated laser point data of the road edge in the grid cell.

6. The method according to claim 2, wherein the at least one road object comprises an upright object by a side of the road, and the extracting the laser point data of the key points of the at least one road object by either side of the road from the road-side laser point cloud data comprises:
dividing the road-side laser point cloud data into a plurality of grid cells according to a preset grid cell size;
when one of the plurality of grid cells comprises laser point data of an upright object by a side of the road, sorting the laser point data of the upright object by the side of the road in ascending order of height values of laser points in the laser point data in the grid cell;
when a difference between height values of two adjacent laser points after the sorting is greater than a difference threshold, updating the laser point data in the grid cell by deleting a laser point having a larger height value in the two adjacent laser points and one or more laser points following the laser point having the larger height value from the laser point data in the grid cell; and determining whether a smallest height value in the updated laser point data of the upright object is smaller than a first height threshold and whether a largest height value in the updated laser point data of the upright object is greater than a second height threshold, and if the smallest height value is smaller than the first height threshold and the largest height value is greater than the second height threshold, obtaining laser point data of a key point of the upright object based on the updated laser point data of the upright object in the grid cell.

7. The method according to claim 1, wherein the matching the to-be-matched positioning data in the coordinate system with the standard positioning data, to obtain a probability that the vehicle is located at each simulated position corresponding to the vehicle at the current moment based on a matching result comprises:
matching laser point data of laser-sensor-output key points of road objects of a same type in the to-be-matched positioning data in the coordinate system and the standard positioning data, to obtain the probability that the vehicle is located at each simulated position corresponding to the vehicle at the current moment based on the matching result.

8. The method according to claim 7, wherein the matching the to-be-matched positioning data in the coordinate system with the standard positioning data, to obtain a probability that the vehicle is located at each simulated position corresponding to the vehicle at the current moment based on a matching result comprises:
matching laser point data of a key point in the to-be-matched positioning data in the coordinate system with laser point data of a key point in the standard positioning data that is the closest to the key point in the to-be-matched positioning data, and calculating a probability that the key point in the to-be-matched positioning data in the coordinate system is a same position point as the key point in the standard positioning data that is the closest to the key point in the to-be-matched positioning data; and
according to a probability that each key point in the to-be-matched positioning data in the coordinate system is a same position point as a key point in the standard positioning data that is the closest to the key point in the to-be-matched positioning data, obtaining a probability that the vehicle is located at a given simulated position, and each key point in the to-be-matched positioning data in the coordinate system corresponding to the given simulated position.

9. The method according to claim 1, wherein the obtaining a position of the vehicle based on the probability that the vehicle is located at each simulated position comprises:
determining a simulated position with a highest probability in probabilities that the vehicle is located as the position of the vehicle; or
performing weighting calculation on each simulated position by using the probability that the vehicle is located at each simulated position as a weight, obtaining a weighted position of the vehicle based on the weighting calculation, and determining the weighted position as the position of the vehicle.

10. A system for positioning, comprising a processor and a non-transitory computer-readable storage medium storing instructions executable by the processor to cause the system to perform operations comprising:
obtaining a Global Navigation Satellite System (GNSS) position of a vehicle;

obtaining, based on the GNSS position of the vehicle, standard positioning data around a road where the vehicle is located from preset standard positioning database, wherein the standard positioning data comprises pre-computed and pre-stored laser point data of GNSS-positioned key points of road objects with stable attributes on or by either side of the road;

obtaining laser point cloud data, outputted by a laser sensor of the vehicle, around the road where the vehicle is located;

extracting to-be-matched positioning data around the road where the vehicle is located from the laser point cloud data, wherein the to-be-matched positioning data comprises laser point data of laser-sensor-output key points of at least one road object with a stable attribute on or by either side of the road where the vehicle is located;

obtaining more than one sampling positions corresponding to the vehicle at a previous moment;

combining the more than one sampling positions with a plurality of position points near the more than one sampling positions to form first sampling positions;

forward simulating a motion state of the vehicle based on the first sampling positions, to obtain more than one simulated positions corresponding to the vehicle at a current moment;

converting the to-be-matched positioning data into a coordinate system corresponding to the standard positioning data based on the more than one simulated positions corresponding to the vehicle at the current moment;

matching the to-be-matched positioning data in the coordinate system with the standard positioning data, to obtain a probability that the vehicle is located at each simulated position corresponding to the vehicle at the current moment based on a matching result; and obtaining a position of the vehicle based on the probability that the vehicle is located at each simulated position corresponding to the vehicle at the current moment.

11. The system of claim 10, wherein the extracting to-be-matched positioning data around the road where the vehicle is located from the laser point cloud data comprises:

classifying the laser point cloud data as road-surface laser point cloud data and/or road-side laser point cloud data; and extracting laser point data of laser-sensor-output key points of at least one road object on the road from the road-surface laser point cloud data or at least one road object by either side of the road from the road-side laser point cloud data.

12. The system of claim 11, wherein the operations further comprise: before the extracting the laser point data of the key points of the at least one road object, fitting a road surface of the road according to the road-surface laser point cloud data; and adjusting, based on the fitted road surface, height values of laser points in the road-surface laser point cloud data and/or the road-side laser point cloud data to height values relative to the fitted road surface.

13. The system of claim 11, wherein the at least one road object comprises a ground marking on the road and the extracting the laser point data of the key points of the at least one road object on the road from the road-surface laser point cloud data comprises:

dividing the road-surface laser point cloud data into a plurality of grid cells according to a preset grid cell size; and when one of the plurality of grid cells comprises laser point data of the ground marking, obtaining laser point data of a key point of the ground marking based on the laser point data of the ground marking in the grid cell.

14. The system of claim 11, wherein the at least one road object comprises a road edge and the extracting the laser point data of the key points of the at least one road object by either side of the road from the road-side laser point cloud data comprises:

dividing the road-side laser point cloud data into a plurality of grid cells according to a preset grid cell size;

when one of the plurality of grid cells comprises laser point data of the road edge, sorting the laser point data of the road edge in ascending order of height values of laser points in the laser point data in the grid cell;

when a difference between height values of two adjacent laser points after the sorting is greater than a difference threshold, updating the laser point data in the grid cell by deleting a laser point having a larger height value in the two adjacent laser points and one or more laser points following the laser point having the larger height value from the laser point data in the grid cell; and obtaining laser point data of a key point of the road edge based on the updated laser point data of the road edge in the grid cell.

15. The system of claim 11, wherein the at least one road object comprises an upright object by a side of the road, and the extracting the laser point data of the key points of the at least one road object by either side of the road from the road-side laser point cloud data comprises:

dividing the road-side laser point cloud data into a plurality of grid cells according to a preset grid cell size;

when one of the plurality of grid cells comprises laser point data of an upright object by a side of the road, sorting the laser point data of the upright object by the side of the road in ascending order of height values of laser points in the laser point data in the grid cell;

when a difference between height values of two adjacent laser points after the sorting is greater than a difference threshold, updating the laser point data in the grid cell by deleting a laser point having a larger height value in the two adjacent laser points and one or more laser points following the laser point having the larger height value from the laser point data in the grid cell; and determining whether a smallest height value in the updated laser point data of the upright object is smaller than a first height threshold and whether a largest height value in the updated laser point data of the upright object is greater than a second height threshold, and if the smallest height value is smaller than the first height threshold and the largest height value is greater than the second height threshold, obtaining laser point data of a key point of the upright object based on the updated laser point data of the upright object in the grid cell.

16. The system of claim 10, wherein the matching the to-be-matched positioning data in the coordinate system with the standard positioning data, to obtain a probability that the vehicle is located at each simulated position corresponding to the vehicle at the current moment based on a matching result comprises:

matching laser point data of laser-sensor-output key points of road objects of a same type in the to-be-matched positioning data in the coordinate system and the standard positioning data, to obtain the probability that the vehicle is located at each simulated position corresponding to the vehicle at the current moment based on the matching result.

17. The system of claim 16, wherein the matching the to-be-matched positioning data in the coordinate system with the standard positioning data, to obtain a probability that the vehicle is located at each simulated position corresponding to the vehicle at the current moment based on a matching result comprises:
- matching laser point data of a key point in the to-be-matched positioning data in the coordinate system with laser point data of a key point in the standard positioning data that is the closest to the key point in the to-be-matched positioning data, and calculating a probability that the key point in the to-be-matched positioning data in the coordinate system is a same position point as the key point in the standard positioning data that is the closest to the key point in the to-be-matched positioning data; and
- according to a probability that each key point in the to-be-matched positioning data in the coordinate system is a same position point as a key point in the standard positioning data that is the closest to the key point in the to-be-matched positioning data, obtaining a probability that the vehicle is located at a given simulated position, and each key point in the to-be-matched positioning data in the coordinate system corresponding to the given simulated position.

18. The system of claim 10, wherein the obtaining a position of the vehicle based on the probability that the vehicle is located at each simulated position comprises:
- determining a simulated position with a highest probability in probabilities that the vehicle is located at simulated positions including the each sampling position as the position of the vehicle; or
- performing weighting calculation on each simulated position by using the probability that the vehicle is located at each simulated position as a weight, obtaining a weighted position of the vehicle based on the weighting calculation, and determining the weighted position as the position of the vehicle.

19. A non-transitory computer-readable storage medium for positioning, configured with instructions executable by one or more processors to cause the one or more processors to perform operations comprising:
- obtaining a Global Navigation Satellite System (GNSS) position of a vehicle;
- obtaining, based on the GNSS position of the vehicle, standard positioning data around a road where the vehicle is located from preset standard positioning database, wherein the standard positioning data comprises pre-computed and pre-stored laser point data of GNSS-positioned key points of road objects with stable attributes on or by either side of the road;
- obtaining laser point cloud data, outputted by a laser sensor of the vehicle, around the road where the vehicle is located;
- extracting to-be-matched positioning data around the road where the vehicle is located from the laser point cloud data, wherein the to-be-matched positioning data comprises laser point data of laser-sensor-output key points of at least one road object with a stable attribute on or by either side of the road where the vehicle is located;
- obtaining more than one sampling positions corresponding to the vehicle at a previous moment;
- combining the more than one sampling positions with a plurality of position points near the more than one sampling positions to form first sampling positions;
- forward simulating a motion state of the vehicle based on the first sampling positions, to obtain more than one simulated positions corresponding to the vehicle at a current moment;
- converting the to-be-matched positioning data into a coordinate system corresponding to the standard positioning data based on the more than one simulated positions corresponding to the vehicle at the current moment;
- matching the to-be-matched positioning data in the coordinate system with the standard positioning data, to obtain a probability that the vehicle is located at each simulated position corresponding to the vehicle at the current moment based on a matching result; and
- obtaining a position of the vehicle based on the probability that the vehicle is located at each simulated position corresponding to the vehicle at the current moment.

20. The non-transitory computer-readable storage medium of claim 19, wherein the obtaining a position of the vehicle based on the probability that the vehicle is located at each sampling position comprises:
- determining a simulated position with a highest probability in probabilities that the vehicle is located at simulated positions including the each simulated position as the position of the vehicle; or
- performing weighting calculation on each simulated position by using the probability that the vehicle is located at each simulated position as a weight, obtaining a weighted position of the vehicle based on the weighting calculation, and determining the weighted position as the position of the vehicle.

* * * * *